(12) United States Patent
Nguyen et al.

(10) Patent No.: US 8,139,697 B2
(45) Date of Patent: Mar. 20, 2012

(54) SAMPLING METHOD AND DATA RECOVERY CIRCUIT USING THE SAME

(75) Inventors: Hai Thanh Nguyen, Los Altos, CA (US); Wei-Liang Chen, Keelung (TW); Yuan-Hui Chen, Hsinchu (TW)

(73) Assignee: United Microelectronics Corp., Hsinchu (TW)

( * ) Notice: Subject to any disclaimer, the term of this patent is extended or adjusted under 35 U.S.C. 154(b) by 817 days.

(21) Appl. No.: 12/021,875

(22) Filed: Jan. 29, 2008

(65) Prior Publication Data

US 2009/0190703 A1 Jul. 30, 2009

(51) Int. Cl.
*H04L 7/00* (2006.01)

(52) U.S. Cl. ........................................... 375/355

(58) Field of Classification Search .................. 375/142, 375/150, 220, 232, 233, 257, 296, 316, 326, 375/354, 355, 360, 371, 374, 376; 327/141, 327/156, 161, 162, 165; 714/700, 707, 725, 714/814
See application file for complete search history.

(56) References Cited

U.S. PATENT DOCUMENTS

| | | | |
|---|---|---|---|
| 5,905,679 A | 5/1999 | Tsukikawa | |
| 6,016,565 A * | 1/2000 | Miura | 714/736 |
| 6,387,807 B1 | 5/2002 | Faubert et al. | |
| 6,587,525 B2 | 7/2003 | Jeong et al. | |
| 7,283,920 B2 * | 10/2007 | Doi et al. | 702/125 |
| 7,436,904 B2 * | 10/2008 | Kwak | 375/316 |
| 8,040,988 B2 * | 10/2011 | Chang et al. | 375/354 |
| 2002/0147875 A1 * | 10/2002 | Singh et al. | 710/305 |
| 2003/0091136 A1 * | 5/2003 | Sugita | 375/355 |
| 2005/0007836 A1 * | 1/2005 | Morzano et al. | 365/193 |
| 2005/0157781 A1 * | 7/2005 | Ho et al. | 375/233 |
| 2005/0201491 A1 * | 9/2005 | Wei | 375/326 |
| 2005/0229132 A1 * | 10/2005 | Butt et al. | 716/10 |
| 2006/0233291 A1 * | 10/2006 | Garlepp et al. | 375/355 |
| 2007/0047683 A1 * | 3/2007 | Okamura et al. | 375/355 |
| 2007/0248201 A1 * | 10/2007 | Ker et al. | 375/355 |

FOREIGN PATENT DOCUMENTS

| | | |
|---|---|---|
| CN | 1350234 A | 5/2002 |
| JP | 2001203676 | 7/2001 |

OTHER PUBLICATIONS

H.S. Muthali et al., "A CMOS 10-Gb/s SONET Tranceiver" JSSC 2004 IEEE Journal of Solid-State Circuits, vol. 39, No. 7, Jul. 2004.
C.K.K. Yang et al., "A 0.5um CMOS 4Gbs serial link tranceiver with data recovery using oversampling" IEEE Journal of Solid-State Circuits, vol. 33, No. 5, May 1998.

* cited by examiner

*Primary Examiner* — David C. Payne
*Assistant Examiner* — Syed Haider
(74) *Attorney, Agent, or Firm* — Chun-Ming Shih

(57) ABSTRACT

A sampling method and a data recovery circuit using the same are provided. The sampling method includes following steps. First, a first strobe, a second strobe, a third strobe, and a fourth strobe are provided, wherein the second strobe lags the first strobe a first predetermined phase, the third and the fourth strobe respectively lag the first and the second strobe a second predetermined phase, and the second predetermined phase is half of the first predetermined phase. Then, a digital signal is respectively sampled with the first and the second strobe. Thereafter, the positions of data transition points of the digital signal are determined according to the sampling results of the first and the second strobe. Next, the third or the fourth strobe is selected as a preferable sampling strobe according to the determination result. Finally, the digital signal is sampled with the preferable sampling strobe.

19 Claims, 15 Drawing Sheets

SAMPLING METHOD AND DATA RECOVERY CIRCUIT USING THE SAME

BACKGROUND OF THE INVENTION

1. Field of the Invention

The present invention generally relates to a sampling method and a data recovery circuit using the same, in particular, to a sampling method offering improved accuracy in data sampling and a data recovery circuit using the same.

2. Description of Related Art

In a high-speed serial link system, mismatch of semiconductor processes or chip layouts, differences in wire-interconnect lengths, temperature variations, variations in intermediate devices, capacitive coupling, material imperfections, and differences in input capacitance on the clock and signal channels always results in asynchrony or skew between strobes and data received by a receiver.

FIG. 1 is a timing diagram of a strobe and a data received by a receiver. As shown in FIG. 1, when the strobe CLK1 received by the receiver is synchronous to the strobe CLK2 of the phase locked loop (PLL), the digital signal DATA received by the receiver is then sampled at the falling edges of the strobe CLK2. Ideally, the data transition points of the digital signal DATA should align with the rising edges of the strobe CLK2. Accordingly, data sampling is carried out at the middle point (i.e. the optimal data sampling point 102 in FIG. 1) of each bit of the digital signal DATA in order to obtain correct data.

However, skews may be caused when the digital signal DATA lags or leads the strobe CLK2. FIG. 2 is another timing diagram of a strobe and a data received by a receiver. Skew 202 is caused when the data transition points of the digital signal DATA are not aligned with the rising edges of the strobe CLK2. If the skew 202 is too large, the falling edges of the strobe CLK2 fall exactly around the data transition points of the digital signal DATA (as denoted by symbol 204). In this case, incorrect data may be obtained.

To resolve foregoing problem, an over sampling technique is disclosed in U.S. Pat. No. 5,905,769. FIG. 3 is a timing diagram of a sampling strobe and a digital signal according to the conventional over sampling technique. In FIG. 3, symbols 24-1~24-12 represent the rising edges or the falling edges of the sampling strobe, which can be referred as sampling edges. Symbols 28-1~28-4 represent four bits in the digital signal DATA, and the values of bits 28-1~28-4 are respectively 1, 0, 1, and 0. Symbols S[0]~S[11] represent the sampling results at different time points, and the number above each sampling result represents the sampled value. As shown in FIG. 3, the frequency of sampling is increased therefore each bit is sampled three times. Taking the first three sampling results S[0]~S[2] as example, it can be determined that the value of the first bit (i.e. bit 28-1) is 1 because all the sampled values of the three sampling results are 1.

Through the over sampling technique described above, correct data can be obtained when the digital signal and the sampling strobe are asynchronous. FIG. 4 is yet another timing diagram of a sampling strobe and a digital signal according to the conventional over sampling technique. Referring to FIG. 4, still taking the first three sampling results S[0]~S[2] as example, it can also be determined that the value of the first bit (i.e. bit 28-1) is 1 because two of the sampled values of the three sampling results are 1 and only one of them is 0. In other words, as long as two of the three sampled values are the same, this value is used as the value of the sampled bit.

However, even though foregoing over sampling technique can increase the accuracy of data sampling, the values of sampled bits may be determined incorrectly when the skews between the digital signal and the sampling strobe are very large and accordingly the sampling edges of the sampling strobe fall on the data transition points of the digital signal.

SUMMARY OF THE INVENTION

Accordingly, the present invention is directed to a sampling method which offers improved accuracy in data sampling.

The present invention is directed to a data recovery circuit which adopts the sampling method provided by the present invention for improving the accuracy in data sampling.

The present invention provides a sampling method including following steps. First, a first strobe, a second strobe, a third strobe, and a fourth strobe are provided, wherein all the strobes have the same frequency, the second strobe lags the first strobe a first predetermined phase, the third strobe and the fourth strobe respectively lag the first strobe and the second strobe a second predetermined phase, and the second predetermined phase is half of the first predetermined phase. Then, a digital signal is respectively sampled with the first strobe and the second strobe, wherein the digital signal is always sampled at the rising edges or the falling edges of the first strobe and the second strobe, and the bit length of the digital signal is equal to the strobe cycles of the first strobe, the second strobe, the third strobe, and the fourth strobe. Next, the positions of data transition points of the digital signal are determined according to the sampling results of the first strobe and the second strobe. Thereafter, the third strobe or the fourth strobe is selected as a preferable sampling strobe according to the determination result. Finally, the digital signal is sampled with the preferable sampling strobe, wherein the sampling edges of the preferable sampling strobe are the same as the sampling edges of the first strobe.

The present invention provides a data recovery circuit including an over sampling module, a time reset module, and a skew control module. The over sampling module receives a first strobe, a second strobe, a third strobe, and a fourth strobe, wherein all the strobes have the same frequency, the second strobe lags the first strobe a first predetermined phase, the third strobe and the fourth strobe respectively lag the first strobe and the second strobe a second predetermined phase, and the second predetermined phase is half of the first predetermined phase. During a first period, the over sampling module samples a digital signal with the first strobe and the second strobe, wherein the digital signal is always sampled at the rising edges or the falling edges of the first strobe and the second strobe. During a second period, the over sampling module samples the digital signal with the third strobe and the fourth strobe, wherein the sampling edges of the third strobe and the fourth strobe are the same as the sampling edges of the first strobe. In addition, the over sampling module converts the sampling results into parallel data and outputs the parallel data, and the bit length of the digital signal is equal to the strobe cycles of the first strobe, the second strobe, the third strobe, and the fourth strobe. The time reset module synchronizes the parallel data output by the over sampling module and generates a synchronized result. During the first period, the skew control module determines the positions of data transition points of the digital signal according to the synchronized result and selects the third strobe or the fourth strobe as a preferable sampling strobe according to the determination result. During the second period, the skew control module controls the time reset module to select the synchronized parallel data obtained with the preferable sampling strobe from the synchronized result as the output of the data recovery circuit.

The present invention further provides a data recovery circuit including an over sampling module, a time reset module, and a skew control module. The over sampling module receives a first strobe, a second strobe, a third strobe, a fourth strobe, a fifth strobe, a sixth strobe, a seventh strobe, and an eighth strobe, wherein all the strobes have the same frequency, the second strobe lags the first strobe a first predetermined phase, the third strobe and the fourth strobe respectively lag the first strobe and the second strobe a second predetermined phase, the fifth strobe, the sixth strobe, the seventh strobe, and the eighth strobe respectively lag the first strobe, the second strobe, the third strobe, and the fourth strobe a third predetermined phase, the second predetermined phase is half of the first predetermined phase, and the third predetermined phase is half of the second predetermined phase. During a first period, the over sampling module samples a digital signal with the first strobe and the second strobe, wherein the digital signal is always sampled at the rising edges or the falling edges of the first strobe and the second strobe. During a second period, the over sampling module samples the digital signal with the third strobe and the fourth strobe, wherein the sampling edges of the third strobe and the fourth strobe are the same as the sampling edges of the first strobe. During a third period, the over sampling module samples the digital signal with the fifth strobe and the sixth strobe or with the seventh strobe and the eighth strobe, wherein the sampling edges of the fifth strobe, the sixth strobe, the seventh strobe, and the eighth strobe are the same as the sampling edges of the first strobe. In addition, the over sampling module converts the sampling results into parallel data and outputs the parallel data, and the bit length of the digital signal is equal to the strobe cycles of foregoing eight strobes. The time reset module synchronizes the parallel data output by the over sampling module and generates a synchronized result. During the first period, the skew control module determines the positions of data transition points of the digital signal according to the synchronized result and selects the third strobe or the fourth strobe as a preferable sampling strobe according to the determination result. During the second period, the skew control module determines the positions of data transition points of the digital signal according to the synchronized result and selects one of two strobes which have a difference of the third predetermined phase from the preferable sampling strobe as an optimal sampling strobe according to the determination result. During the third period, the skew control module controls the over sampling module to select the optimal sampling strobe and a strobe which has a difference of the first predetermined phase from the optimal sampling strobe for sampling the digital signal, and the skew control module controls the time reset module to select the synchronized parallel data obtained with the optimal sampling strobe from the synchronized result as the output of the data recovery circuit.

According to an embodiment of the present invention, the delay time of the digital signal is further controlled according to the positions of data transition points of the digital signal so as to adjust the middle points of the bits of the digital signal to be at the sampling edges of the preferable (optimal) sampling strobe or close to the sampling edges of the preferable (optimal) sampling strobe.

In the present invention, four sampling strobes having the same frequency but different phase delays are provided, wherein the second strobe lags the first strobe a first predetermined phase, the third strobe and the fourth strobe respectively lag the first strobe and the second strobe a second predetermined phase, and the second predetermined phase is half of the first predetermined phase. Next, the positions of data transition points of a digital signal are determined with the first strobe and the second strobe, and one of the third strobe and the fourth strobe which has its sampling edges closer to the middle points of the bits of the digital signal is selected as a preferable sampling strobe, and the digital signal is sampled with the preferable sampling strobe in order to increase accuracy in data sampling. Moreover, in the present invention, the delay time of the digital signal can be further adjusted so as to adjust the middle points of the bits of the digital signal to be at the sampling edges of the preferable sampling strobe or close to the sampling edges of the preferable sampling strobe, so that the accuracy in data sampling can be further improved.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
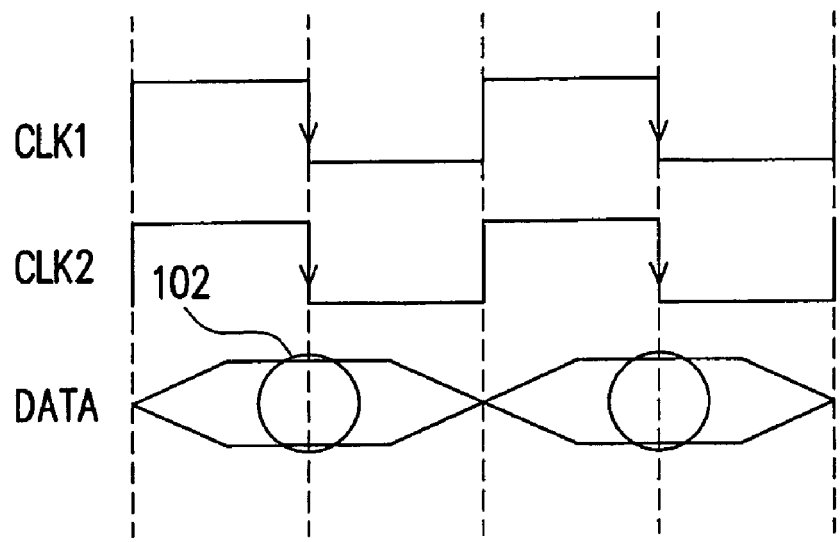
FIG. 1 is a timing diagram of a strobe and a data received by a receiver.
Figure 2:
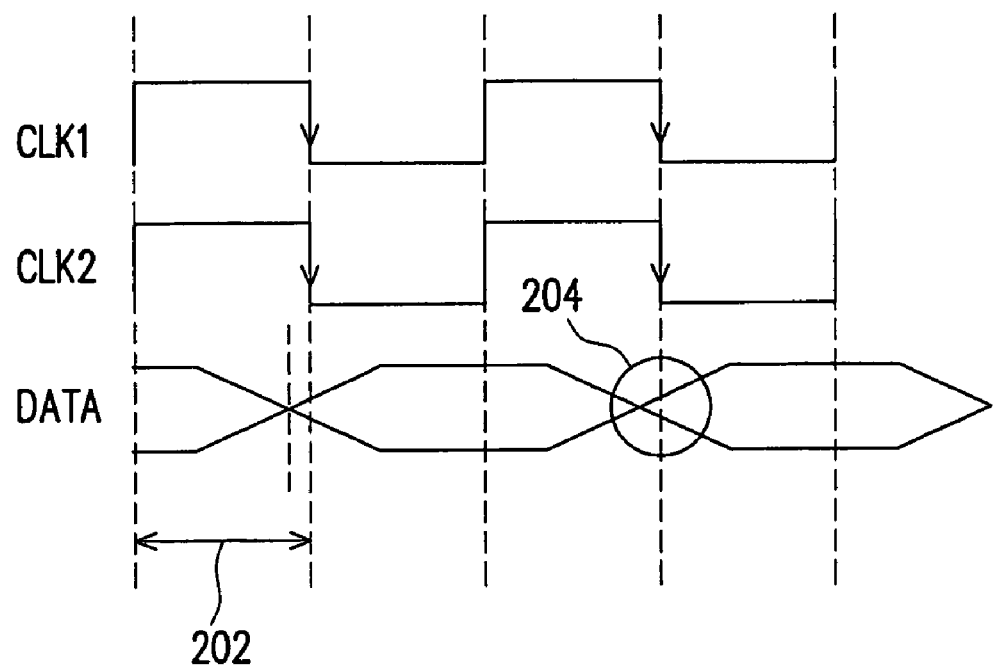
FIG. 2 is another timing diagram of a strobe and a data received by a receiver.
Figure 3:
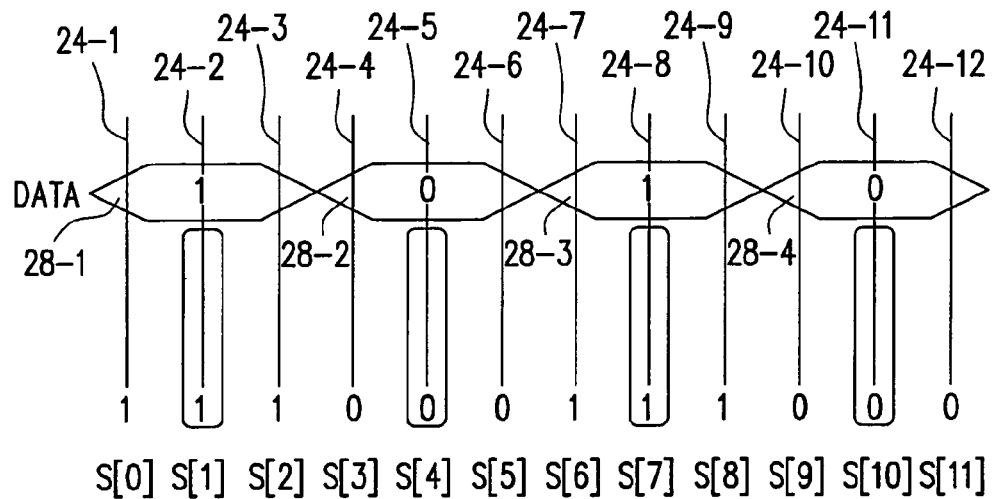
FIG. 3 is a timing diagram of a sampling strobe and a digital signal in a conventional over sampling technique.
Figure 4:
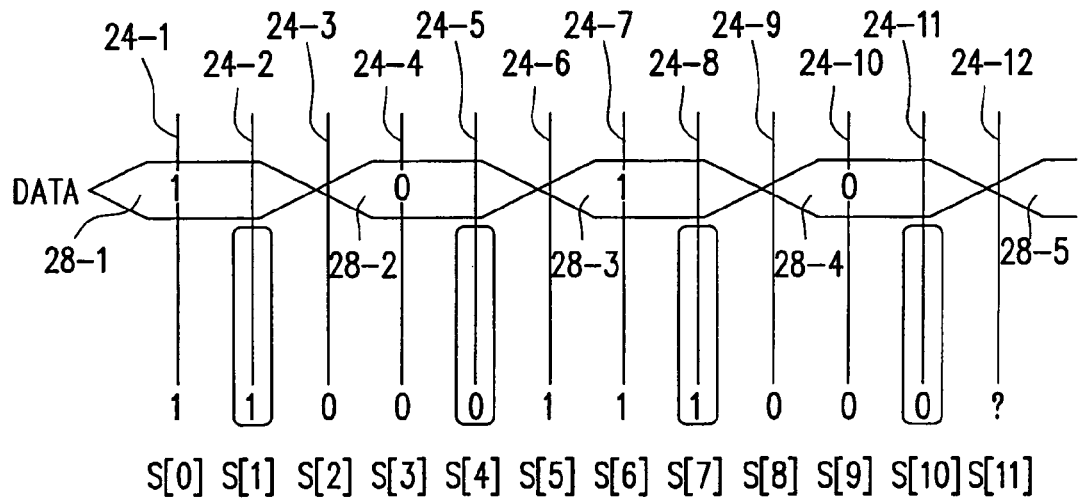
FIG. 4 is another timing diagram of a sampling strobe and a digital signal in a conventional over sampling technique.

Reference will now be made in detail to the present preferred embodiments of the invention, examples of which are illustrated in the accompanying drawings. Wherever possible, the same reference numbers are used in the drawings and the description to refer to the same or like parts.

Figure 5A:
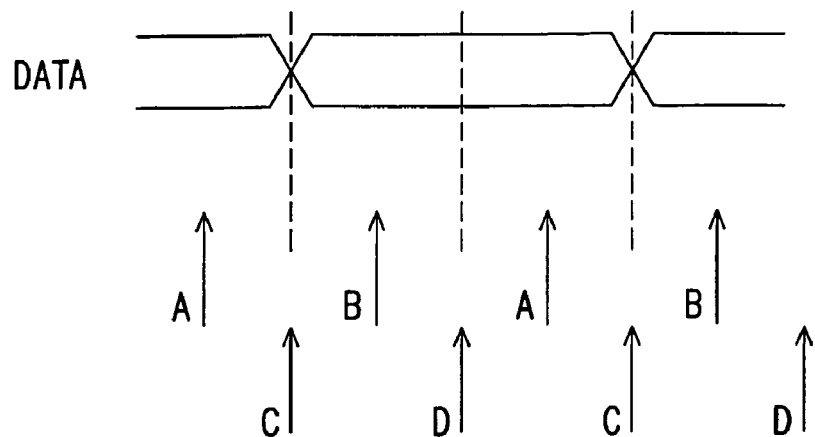
FIGS. 5(a)~5(c), FIGS. 6(a)~6(c), FIGS. 7(a)~7(b), FIGS. 8(a)~8(c), FIGS. 9(a)~9(c), and FIGS. 10(a)~10(b) illustrate a sampling method according to embodiments of the present invention.

FIG. 5(a) illustrates a sampling method according to an embodiment the present invention. Referring to FIG. 5(a), for the convenience of description, symbols A, B, C, and D represent four strobes having the same frequency but different phase delays, and the same symbols refer to the same strobes throughout all the figures. The arrows beside the symbols A, B, C, and D represent the sampling edges of the strobes, for example, the two arrows besides symbol A represent the sampling edges of two adjacent pulses of strobe A.

Among the four strobes, strobe B lags strobe A a first predetermined phase, strobe C and strobe D respectively lag strobe A and strobe B a second predetermined phase, and the second predetermined phase is half of the first predetermined phase. In the present embodiment, the first predetermined phase is preset to 180° and accordingly the second predetermined phase is 90°. As shown in FIG. 5(a), strobe A, strobe B, strobe C, and strobe D all use their rising edges or falling edges as sampling edges. In addition, symbol DATA represents a digital signal and the data of the digital signal is transmitted in series. The bit length of the digital signal DATA is equal to the strobe cycles of foregoing four strobes.

Referring to FIG. 5(a) again, first, the digital signal DATA is respectively sampled with strobe A and strobe B. Next, the positions of data transition points of the digital signal DATA are determined according to the sampling results of strobe A and strobe B. The method for determining the positions of data transition points of the digital signal DATA can be expressed as:

$$(A[0] \text{XOR } B[0]) + (A[1] \text{XOR } B[1]) + (A[2] \text{XOR } B[2]) + \ldots + (A[M-1] \text{XOR } B[M-1]) \quad \text{(Expression 1)}$$

$$(B[0] \text{XOR } A[1]) + (B[1] \text{XOR } A[2]) + (B[2] \text{XOR } A[3]) + \ldots + (B[M-1] \text{XOR } A[M]) \quad \text{(Expression 2)},$$

wherein expression 1 is used for determining whether the data transition points of the digital signal are located after the sampling edges of strobe A and before the sampling edges of strobe B, and expression 2 is used for determining whether the data transition points of the digital signal are located after the sampling edges of strobe B and before the sampling edges of strobe A.

In expression 1 and expression 2, A[0]~A[M] represent (M+1) sampling results of strobe A, and B[0]~B[M] represent (M+1) sampling results of strobe B, wherein M is a positive integer. The reason for obtaining a plurality of sampling results is to confirm the accuracy of sampling result. XOR represents an exclusive OR calculation performed on the sampling results of strobe A and strobe B. Both expression 1 and expression 2 are used for determining the positions of data transition points of the digital signal DATA. If the value obtained from expression 1 is non-zero and the value obtained from expression 2 is zero, it is determined that the data transition points of the digital signal DATA are located after the sampling edges of strobe A and before the sampling edges of strobe B. In other words, one of the data transition points is located between A[0] and B[0], or located between A[1] and B[1], and so on. Otherwise, if the value obtained from expression 1 is zero and the value obtained from expression 2 is non-zero, it is determined that the data transition points of the digital signal are located after the sampling edges of strobe B and before the sampling edges of strobe A. In other words, one of the data transition points is located between B[0] and A[1], or located between B[1] and A[2], and so on.

Next, strobe C or strobe D is selected as a preferable sampling strobe according to the determination result. In the present embodiment, the data transition points of the digital signal DATA are located after the sampling edges of strobe A and before the sampling edges of strobe B and are exactly in the middle between the sampling edges of strobe A and strobe B, thus, the sampling edges of strobe D are located at the middle points of the bits of the digital signal DATA (i.e. the optimal data sampling points), and accordingly, strobe D can be selected as the preferable sampling strobe for data sampling. In a strict system, the step of determining the positions of data transition points of the digital signal DATA with strobe A and strobe B is repeated many times in order to avoid misjudgement in the positions of data transition points of the digital signal.

Figure 5B:
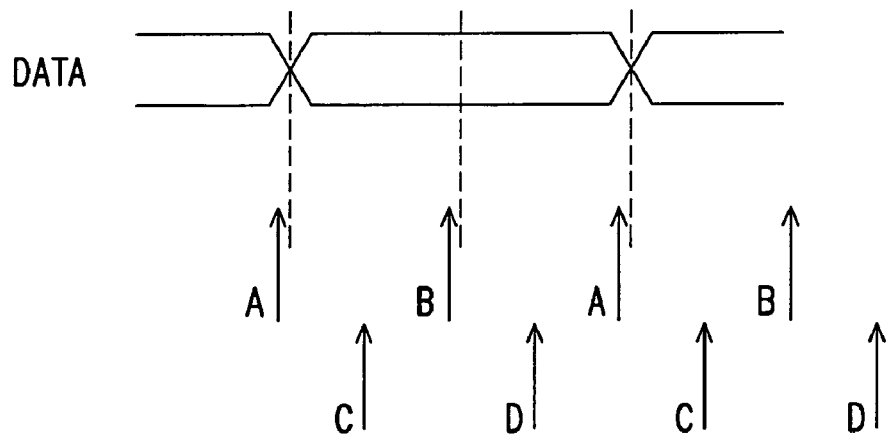
Figure 5C:
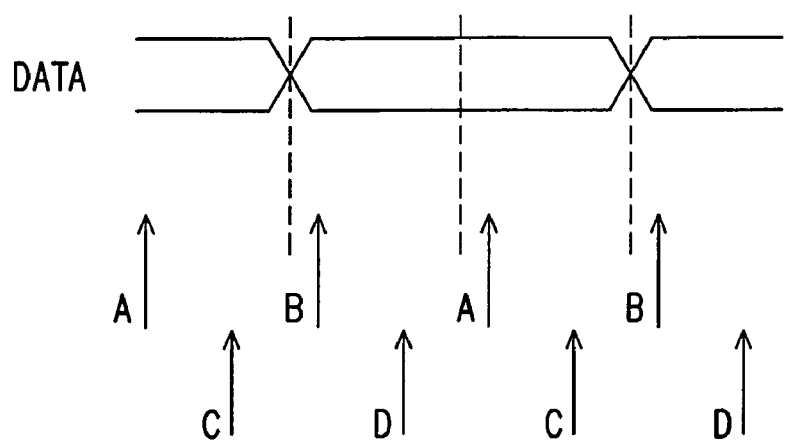

Because in the example illustrated in FIG. 5(a), the sampling edges of strobe D fall exactly on the middle points of the bits of the digital signal DATA, this example is an ideal situation. However, in a non-ideal situation, the sampling edges of the preferable sampling strobe selected according to the determination result are still located close to the middle points of the bits of the digital signal DATA. FIG. 5(b) and FIG. 5(c) illustrate a sampling method according to an embodiment the present invention. First, referring to FIG. 5(b), the data transition points of the digital signal DATA are also located after the sampling edges of strobe A and before the sampling edges of strobe B but are closer to the sampling edges of strobe A. Accordingly, among the sampling edges of strobe C and strobe D, the sampling edges of strobe D are closer to the middle points of the bits of the digital signal DATA, thus, strobe D is selected for data sampling. Then referring to FIG. 5(c), the data transition points of the digital signal DATA are also located after the sampling edges of strobe A and before the sampling edges of strobe B but are closer to the sampling edges of strobe B, thus, strobe D is selected for data sampling.

Figure 6A:
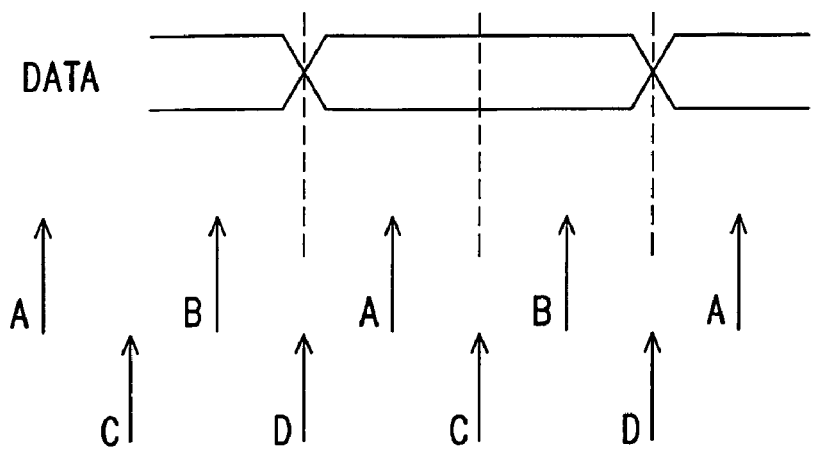
Figure 6B:
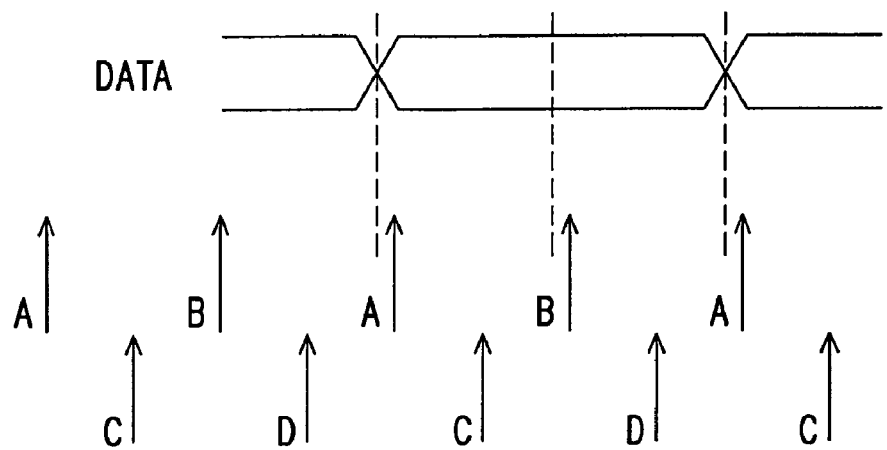
Figure 6C:
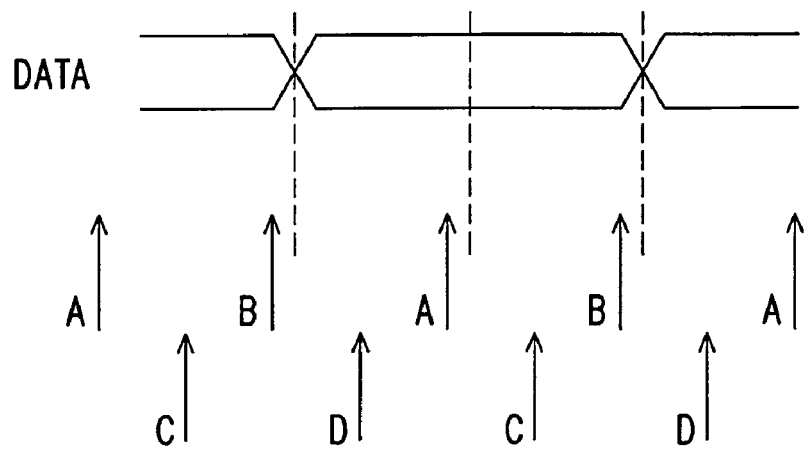
Figure 7A:
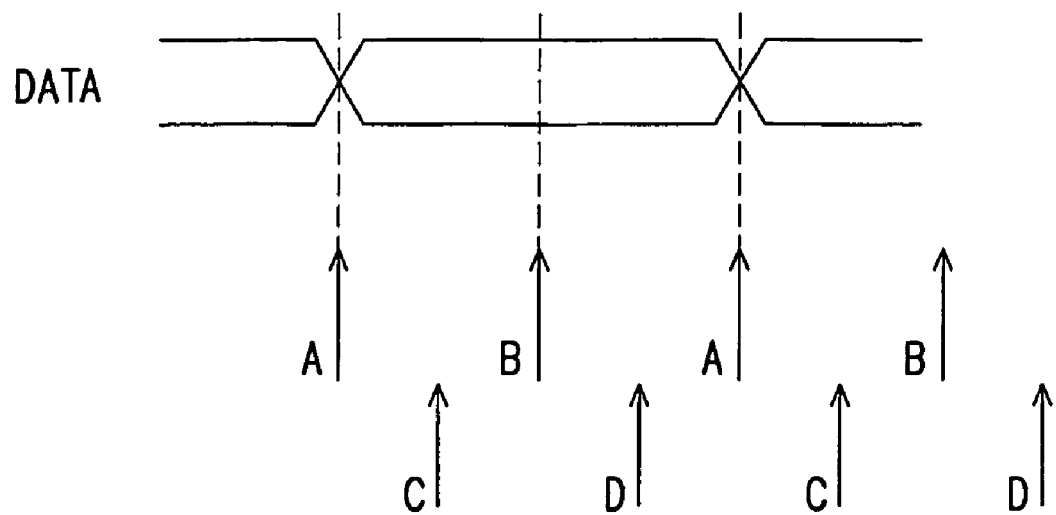
Figure 7B:
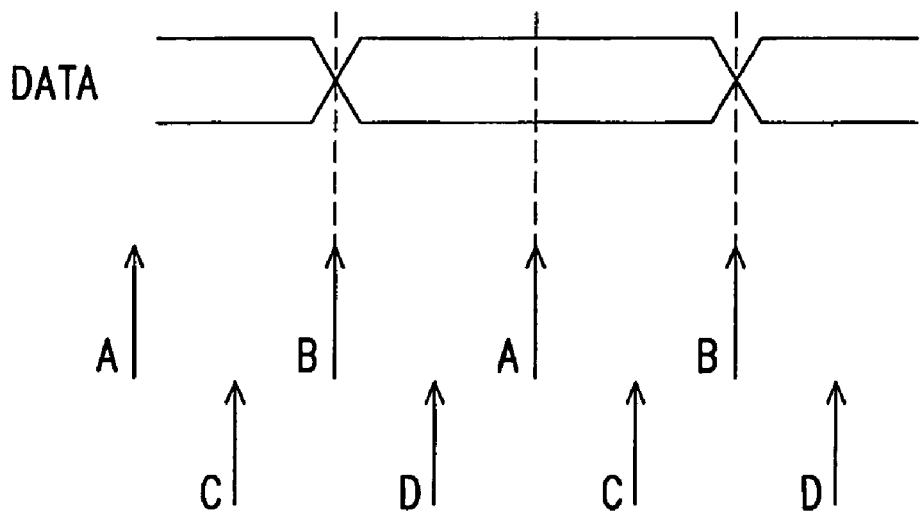

In the embodiments illustrated in FIGS. 5(a)~5(c), the positions of data transition points of the digital signal are located after the sampling edges of strobe A and before the sampling edges of strobe B, and accordingly, strobe D is always selected as the preferable sampling strobe. However, if the data transition points of the digital signal are located after the sampling edges of strobe B and before the sampling edges of strobe A, then strobe C should be selected as the preferable sampling strobe. FIGS. 6(a)~6(c) illustrates a sampling method according to another embodiment the present invention. The operation illustrated in FIGS. 6(a)~6(c) is very similar to that illustrated in FIGS. 5(a)~5(c) therefore will not be described herein. Besides the situations illustrated in FIGS. 5(a)~5(c) and FIGS. 6(a)~6(c), when it is determined that the data transition points of the digital signal are located at the sampling edges of strobe A or at the sampling edges of strobe B, one of strobe C and strobe D is selected as the preferable sampling strobe, as shown in FIG. 7(a) and FIG. 7(b) which illustrate a sampling method according to yet another embodiment of the present invention.

As described above, because the possibility that the sampling edges of the preferable sampling strobe being located at the data transition points of the digital signal has been eliminated while selecting the preferable sampling strobe, the data obtained through such a sampling method has higher accuracy compared to that obtained through the conventional technique.

Additionally, in a non-ideal situation, the sampling edges of the preferable sampling strobe will not be located on the middle points of the bits of the digital signal DATA. The present invention further provides a method, in the method, the middles points of the bits of the digital signal DATA can be moved to the sampling edges of the preferable sampling strobe or at least close to the sampling edges of the preferable sampling strobe by appropriately adjusting the delay time of the digital signal DATA.

The adjusting method of delay time is described as follows. Firstly, after the strobe C or the strobe D has been selected as a preferable sampling strobe, it is determined that the data transition points of the digital signal DATA are located after the sampling edges of the strobe C and before the sampling edges of the strobe D, or located after the sampling edges of the strobe D and before the sampling edges of the strobe C, then the delay time of the digital signal DATA is adjusted according to the determination result. For an example, if the strobe D is selected as a preferable sampling strobe, and it is determined that the data transition points of the digital signal DATA are located after the sampling edges of the strobe C and before the sampling edges of the strobe D, it can be seen that the middles points of the bits of the digital signal DATA are lag the sampling edges of the strobe D. Thus, the delay time of the digital signal DATA must be decreased, then the middles points of the bits of the digital signal DATA can be moved to the sampling edges of the strobe D. Otherwise, if the strobe D is selected as a preferable sampling strobe, and it is determined that the data transition points of the digital signal DATA are located after the sampling edges of the strobe D and before the sampling edges of the strobe C, it can be seen that the middles points of the bits of the digital signal DATA are precede the sampling edges of the strobe D. Thus, the delay time of the digital signal DATA must be increased, then the middles points of the bits of the digital signal DATA can be moved to the sampling edges of the strobe D. Similarly, if the strobe C is selected as a preferable sampling strobe, the delay time of the digital signal DATA can be adjusted by the same way.

In the mentioned adjusting method of delay time, no matter the delay time of the digital signal DATA is increased or decreased, each adjustment of delay time may implemented in single phase or a plurality of phases. For an example of two phases, the delay time of the digital signal DATA is roughly adjusted and then finely adjusted. The delay time of the digital DATA is adjusted substantially by using the rough adjustment, and the middles points of the bits of the digital signal DATA is moved closer to the sampling edges of the preferable sampling strobe by using the fine adjustment. Wherein, the adjusting range of the rough adjustment (i.e. first phase adjustment) is smaller than or equal to a quarter of the bit length of the digital signal DATA.

Besides, the adjustment of each phase cannot be completed with only one action; instead, the adjustment in each phase can be repeated many times according to the actual requirement, and the positions of data transition points are determined after each adjustment, so as to determine whether or not the positions of middles points of the bits is moved too much, and to obtain the optimal delay time of this phase. An execution time is set to each phase and the last delay time obtained is used as the optimal delay time of the phase if the adjustment of a particular phase alternates between two delay times (namely, toggle effect takes place).

The number of strobes in a sampling method provided by the present invention may also be increased by those skilled in the art as long as the total number of the strobes is $2^N$, wherein N is a positive integer. FIG. 8($a$) illustrates a sampling method according to an embodiment of the present invention. Referring to both FIG. 5($a$) and FIG. 8($a$), four more strobes respectively denoted as strobes A', B', C', and D' are further disposed in FIG. 8($a$), wherein the same symbols denote the same strobes. The arrows besides the symbols A', B', C', and D' represent the sampling edges of the strobes. For example, the two arrows beside symbol A' represent the sampling edges of two adjacent pulses of strobe A'.

Among the eight strobes, the frequencies of strobe A', strobe B', strobe C', and strobe D' are the same as the frequency of strobe A, strobe A', strobe B', strobe C', and strobe D' respectively lag strobe A, strobe B, strobe C, and strobe D a third predetermined phase, and the third predetermined phase is half of the second predetermined phase. In the present embodiment, the first predetermined phase is also set to 180°, thus, the second predetermined phase is 90° and the third predetermined phase is 45°. As shown in the FIG. 8($a$), a digital signal is always sampled at the rising edges or the falling edges of strobe A', strobe B', strobe C', and strobe D', and the sampling edges of the four strobes are the same as the sampling edges of strobe A. In addition, the symbol DATA also denotes a digital signal, and the bit length of the digital signal DATA is equal to the strobe cycles of foregoing eight strobes.

Referring to FIG. 8($a$) again, even though eight strobes are used here, the method for selecting the preferable sampling strobe is the same as that illustrated in FIG. 5($a$). In the present embodiment, the positions of data transition points of the digital signal are determined with strobe A and strobe B, and then strobe D is selected among strobe C and strobe D as the preferable sampling strobe. However, the difference between the sampling methods illustrated in FIG. 8($a$) and FIG. 5($a$) is that in the method illustrated in FIG. 8($a$), one of strobe C and strobe D which is different from the preferable sampling strobe is used as a reference strobe (i.e. strobe C is used as the reference strobe), and then the digital signal DATA is sampled with strobe C and strobe D. After that, the positions of data transition points of the digital signal DATA are determined according to the sampling results of strobe D and strobe C. The method for determining the positions of data transition points of the digital signal DATA can be expressed as:

$$(C[0]\text{XOR } D[0])+(C[1]\text{XOR } D[1])+(C[2]\text{XOR } D[2])+\ldots+(C[M-1]\text{XOR } D[M-1]) \quad \text{(Expression 3)}$$

$$(D[0]\text{XOR } C[1])+(D[1]\text{XOR } C[2])+(D[2]\text{XOR } C[3])+\ldots+(D[M-1]\text{XOR } C[M]) \quad \text{(Expression 4)},$$

wherein expression 3 is used for determining whether the positions of data transition points of the digital signal DATA are located after the sampling edges of strobe C and before the sampling edges of strobe D, and expression 4 is used for determining whether the positions of data transition points of the digital signal DATA are located after the sampling edges of strobe D and before the sampling edges of strobe C.

In expression 3 and expression 4, C[]~C[M] represents (M+1) sampling results of strobe C, and D[0]~D[M] represent (M+1) sampling results of strobe D, wherein M is a positive integer. XOR represents an exclusive OR operation performed on the sampling results of strobe C and strobe D. Both expression 3 and expression 4 are used for determining the positions of data transition points of the digital signal DATA. If the value obtained from expression 3 is non-zero and the value obtained from expression 4 is zero, it is determined that the data transition points of the digital signal DATA are located after the sampling edges of strobe C and before the sampling edges of strobe D. Otherwise, if the value obtained from expression 3 is zero and the value obtained from expression 4 is non-zero, it is determined that the data transition points of the digital signal DATA are located after the sampling edges of strobe D and before the sampling edges of strobe C.

Next, one of two strobes which have a difference of 45° from strobe D (i.e. the preferable sampling strobe) is selected as an optimal sampling strobe according to the determination result, namely, strobe B' or strobe D' is selected as the optimal sampling strobe. In FIG. 8($a$), since the positions of data transition points of the digital signal DATA are exactly in the middle of the sampling edges of strobe A and strobe B and are at the sampling edges of strobe C, strobe B' or strobe D' is selected as the optimal sampling strobe. In the present embodiment, even the sampling edges of strobe B' and strobe D' are not located on the middle points of the bits of the digital signal DATA, but they are very close to those, thus, correct data can be sampled. In a strict system, the step of determining the positions of data transition points of the digital signal with strobe C and strobe D can also be repeated many times in order to avoid misjudgement in the positions of data transition points of the digital signal.

Figure 8A:
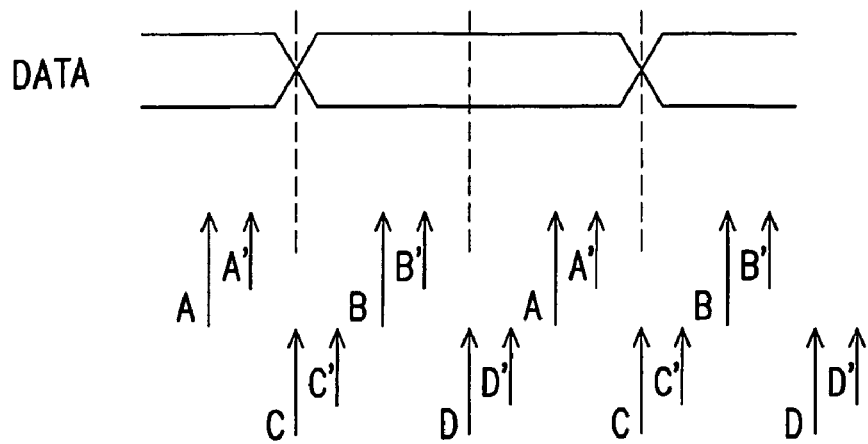
Figure 8B:
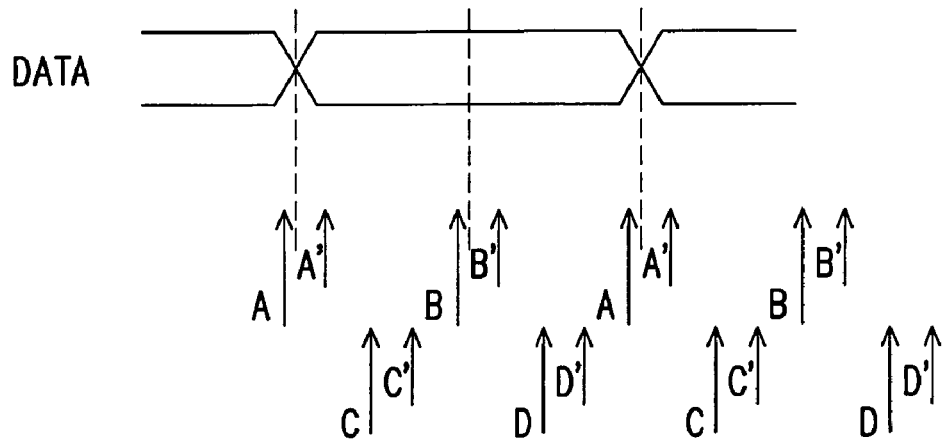
Figure 8C:
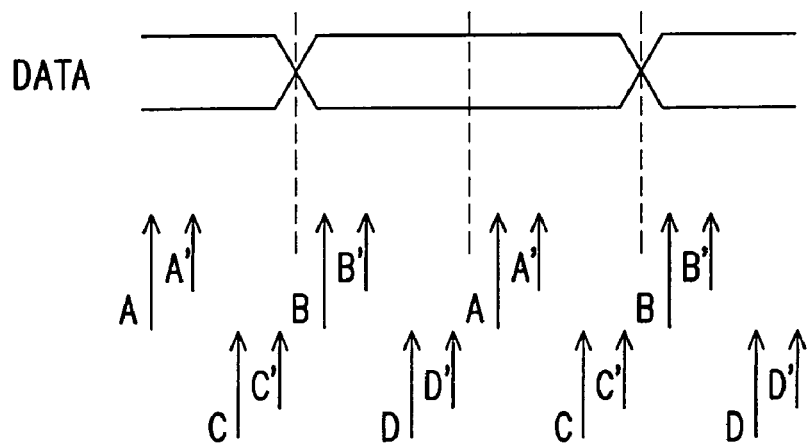

FIG. 8($b$) and FIG. 8($c$) illustrates a sampling method according to an embodiment of the present invention, wherein eight strobes are used. First, referring to FIG. 8(b), the data transition points of the digital signal DATA are located after the sampling edges of strobe D and before the sampling edges of strobe C but are closer to the sampling edges of strobe C, thus, among the sampling edges of strobe B' and strobe D', the sampling edges of strobe B' are closer to the middle points of the bits of the digital signal DATA, therefore strobe B' is selected for data sampling. Then referring to FIG. 8(c), the data transition points of the digital signal DATA are located after the sampling edges of strobe C and before the sampling edges of strobe D but are closer to the sampling edges of strobe C, thus, strobe D' is selected for data sampling.

Figure 9A:
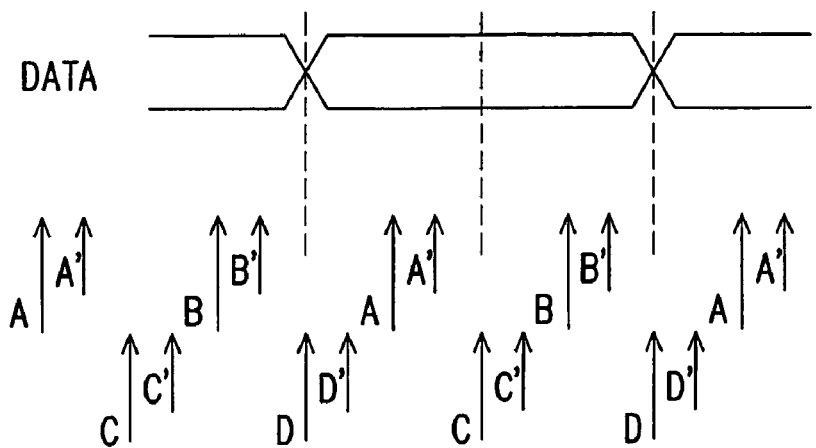
Figure 9B:
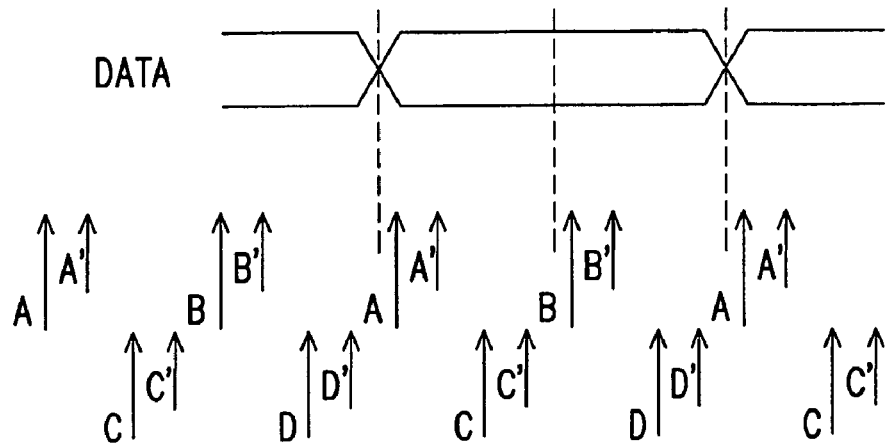
Figure 9C:
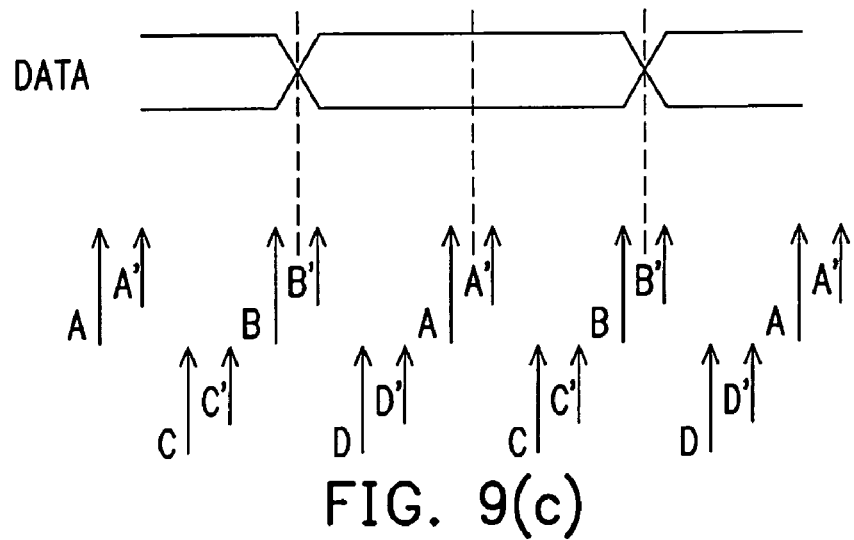
Figure 10A:
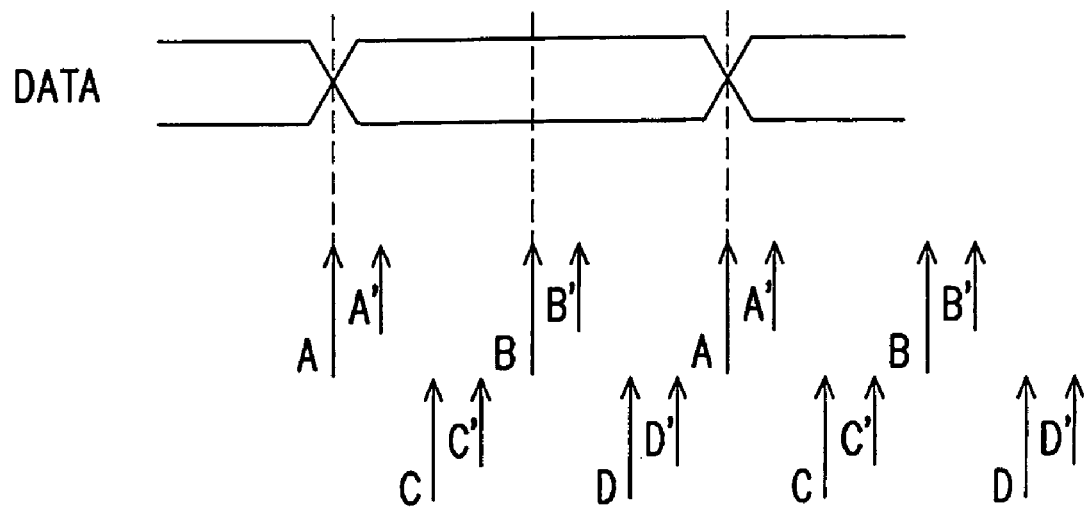
Figure 10B:
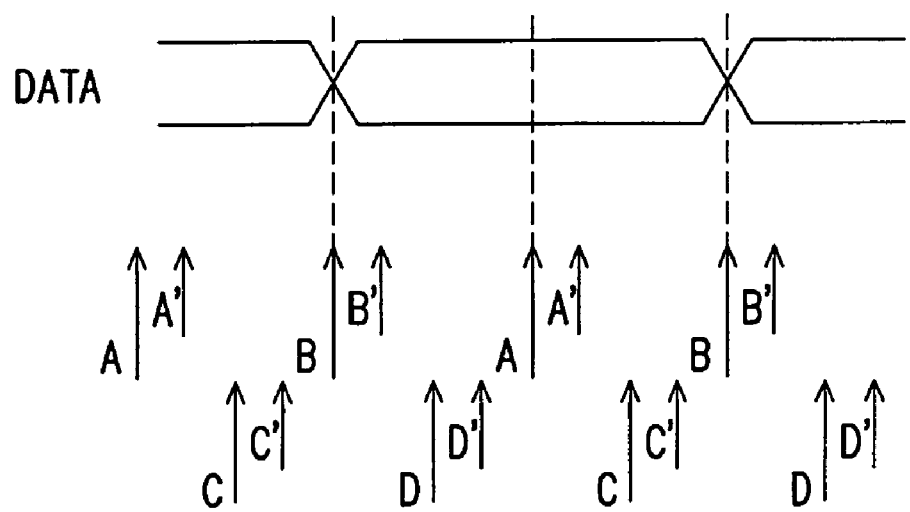

In the embodiments illustrated in FIGS. 8(a)~8(c), the data transition points of the digital signal are all located after the sampling edges of strobe A and before the sampling edges of strobe B, and the optimal sampling strobe is then determined with strobe C and strobe D. Below, the situation that the data transition points of the digital signal are located after the sampling edges of strobe B and before the sampling edges of strobe A and the optimal sampling strobe is then determined with strobe C and strobe D will be described. FIGS. 9(a)~9(c) illustrate a sampling method according to an embodiment the present invention. In addition, the situation that the data transition points of the digital signal are located at the sampling edges of strobe A or at the sampling edges of strobe B and the optimal sampling strobe is then determined with strobe C and strobe D is illustrated in FIG. 10(a) and FIG. 10(b). FIG. 10(a) and FIG. 10(b) illustrate a sampling method according to an embodiment of the present invention. The operations illustrated in FIGS. 9(a)~9(c) and FIGS. 10(a)~10(b) are very similar to that illustrated in FIGS. 8(a)~8(c) and the timing relationship between various strobes and the digital signal have been illustrated in these figures, the optimal sampling strobe can be selected easily therefore will not be described herein.

As described above, the accuracy of data sampling performed with eight strobes is higher than that performed with four strobes. In addition, even in a non-ideal situation, the sampling edges of the optimal sampling strobe are not located on the middle points of the bits of the digital signal DATA, however, the middle points of the bits of the digital signal DATA can also be moved to the sampling edges of the optimal sampling strobe or at least close to the sampling edges of the optimal sampling strobe by appropriately adjusting the delay time of the digital signal DATA (i.e. by the adjusting method of the delay time of the digital signal DATA mentioned above). The delay range achieved by controlling the delay time of the digital signal DATA is smaller than or equal to an eighth of the bit length of the digital signal DATA.

Figure 11:
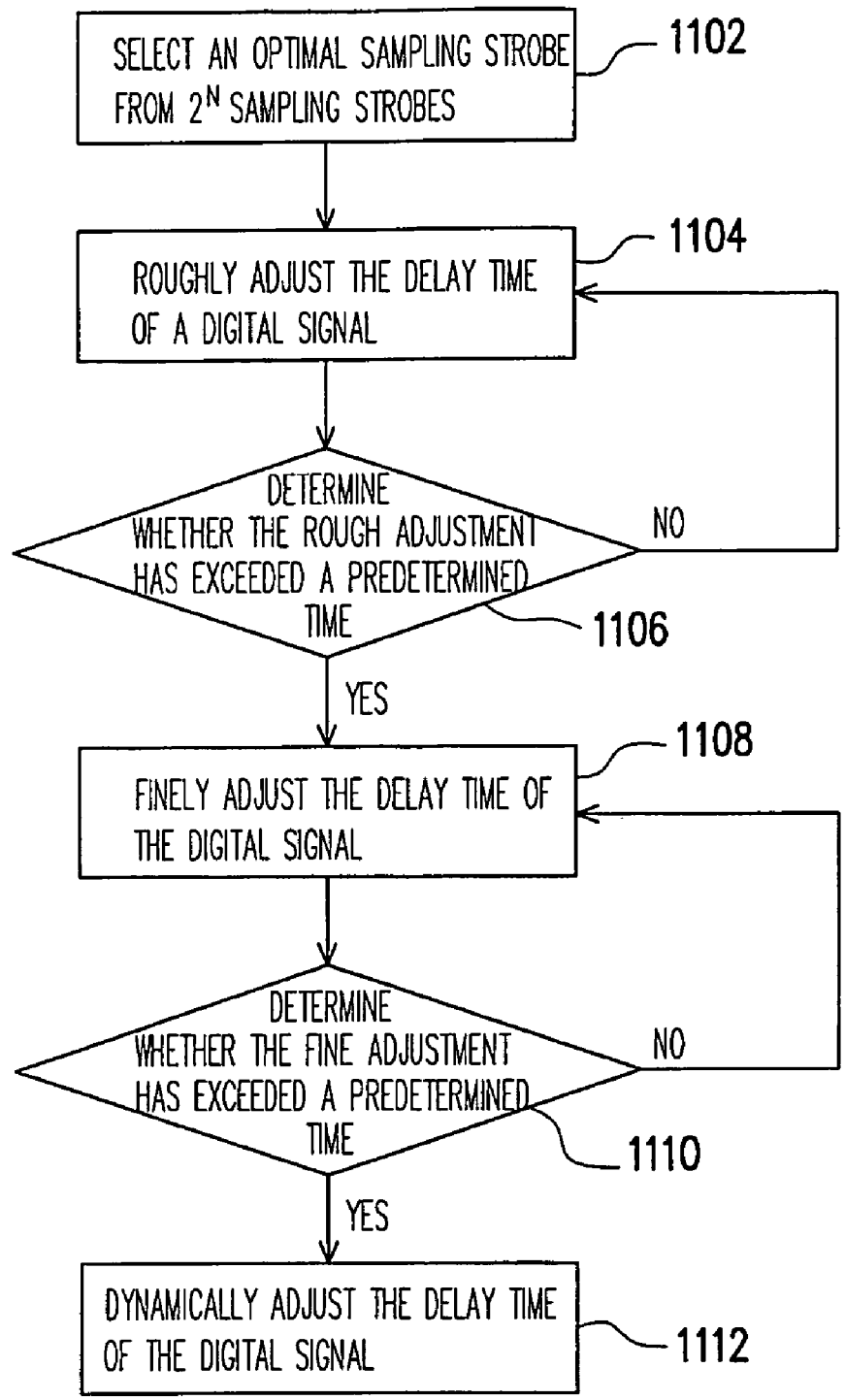
FIG. 11 is an operation flowchart of a sampling system adopting a sampling method provided by the present invention.

As described above, the operation flow of a sampling system adopting the sampling method provided by the present invention should include adjusting the delay time of a digital signal. FIG. 11 is an operation flowchart of a sampling system adopting a sampling method provided by the present invention. Referring to FIG. 11, the operation flow of the sampling system (not shown) includes following steps. First, an optimal sampling strobe is selected from $2^N$ sampling strobes (step 1102). Next, the delay time of a digital signal is roughly adjusted (step 1104). After that, whether the rough adjustment has exceeded a predetermined time is determined (step 1106). If the rough adjustment has not exceeded the predetermined time, the delay time of the digital signal is roughly adjusted again; otherwise, the delay time of the digital signal is finely adjusted (step 1108). Thereafter, whether the fine adjustment has exceeded a predetermined time is determined (step 1110). If the fine adjustment has not exceeded the predetermined time, the delay time of the digital signal is finely adjusted again; otherwise, the delay time of the digital signal is dynamically adjusted, then the middle points of the bits of the digital signal can be adjusted closer to the sampling edges of the selected sampling strobe (step 1112). The possibility of the sampling system sampling incorrect data is greatly reduced through such a sampling method. The adjustment of delay time described in FIG. 11 may includes two phases or only one phase, for an example, just only rough adjustment, so the step 1112 is directly executed when it is determined that the rough adjustment has exceeded the predetermined time.

Figure 12:
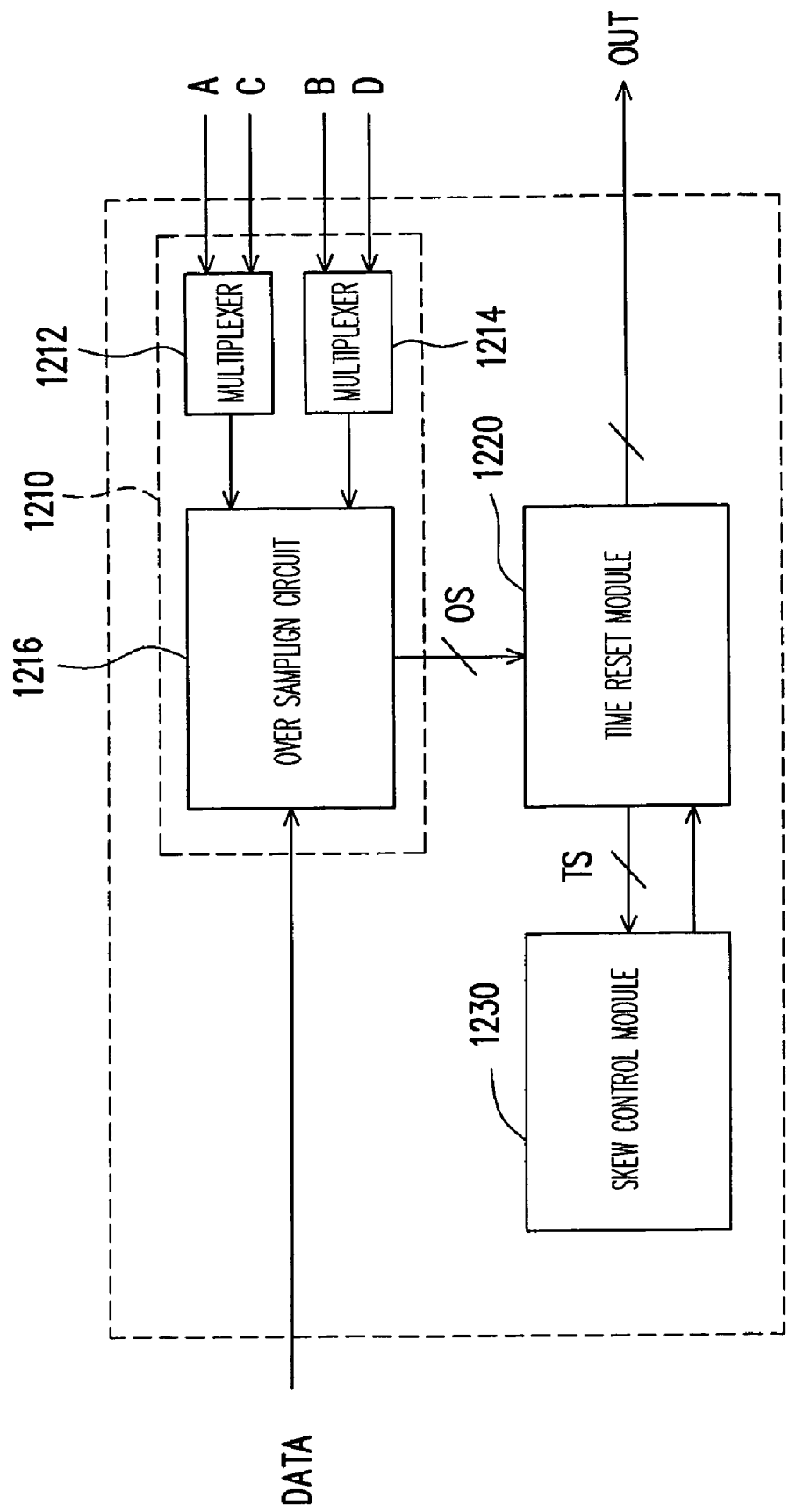
FIG. 12, FIG. 13, FIG. 15, and FIG. 16 are block diagrams of a data recovery circuit according to embodiments of the present invention.

FIG. 12 is a block diagram of a data recovery circuit according to an embodiment of the present invention. Referring to FIG. 12, the data recovery circuit includes an over sampling module 1210, a time reset module 1220, and a skew control module 1230. The over sampling module 1210 receives a strobe A, a strobe B, a strobe C, and a strobe D, wherein all the four strobes have the same frequency, strobe B lags strobe A a first predetermined phase, strobe C and strobe D respectively lag strobe A and strobe B a second predetermined phase, and the second predetermined phase is half of the first predetermined phase. In the present embodiment, the first predetermined phase is set to 180°, and accordingly, the second predetermined phase is 90°. Besides, the data of the digital signal DATA is transmitted in series, and the bit length of the digital signal DATA is equal to the strobe cycles of foregoing four strobes.

The operation of the circuit illustrated in FIG. 12 can be divided into two periods. First, during the first period, the over sampling module 1210 samples the digital signal DATA with strobe A and strobe B, wherein the digital signal DATA is always sampled at the rising edges or the falling edges of strobe A and strobe B. Besides, the over sampling module 1210 converts the sampling results into a parallel data and outputs the parallel data as an output OS. Next, the time reset module 1220 synchronizes the parallel data output by the over sampling module 1210 and generates a synchronized result TS. The synchronized result TS is a synchronized parallel data, and accordingly, the time difference between the data is eliminated. In the present embodiment, the parallel data can be synchronized by re-sampling the parallel data with an independent strobe. After that, the skew control module 1230 determines the positions of data transition points of the digital signal DATA according to the synchronized result TS and selects strobe C or strobe D as a preferable sampling strobe according to the determination result. The method for determining the positions of data transition points of the digital signal DATA has been explained in the description related to foregoing expression 1 and expression 2, and the method for selecting the preferable sampling strobe has been described in foregoing embodiments, therefore will not be described herein.

After the preferable sampling strobe has been selected, the operation of the data recovery circuit enters a second period. During the second period, the over sampling module 1210 samples the digital signal DATA with strobe C and strobe D, wherein the sampling edges of strobe C and strobe D are the same as the sampling edges of strobe A. Moreover, the over sampling module 1210 converts the sampling results into a parallel data and outputs the parallel data as an output OS. Next, the time reset module 1220 synchronizes the parallel data output by the over sampling module 1210 and generates a synchronized result TS. After that, the skew control module 1230 controls the time reset module 1220 to select the synchronized parallel data obtained with the preferable sampling strobe from the synchronized result TS as the output OUT of the data recovery circuit.

In the present embodiment, the over sampling module 1210 includes multiplexers 1212, 1214 and an over sampling circuit 1216. The multiplexer 1212 receives strobe A and strobe C and respectively outputs strobe A and strobe C during the first period and the second period. The multiplexer 1214 receives strobe B and strobe D and respectively outputs strobe B and strobe D during the first period and the second period. The over sampling circuit 1216 samples the digital signal DATA by using the strobes output by the multiplexers 1212 and 1214. In addition, an independent selection signal (not shown) can be input to the multiplexers 1212 and 1214 for controlling the two multiplexers to select strobes as long as the selection target of the selection signal matches the selection target in the first period and the second period. The selection signal may also be output by the skew control module 1230 through suitable circuit design.

As mentioned in the description related to FIG. 11, the operation flow of the sampling system adopting the sampling method of the present invention should include adjusting the delay time of the digital signal, and the method for controlling the delay time of the digital signal includes controlling the delay time of the digital signal DATA in a plurality of phases. Below, the situation of controlling the delay time of the digital signal DATA in two phases will be described as an example with reference to FIG. 13.

Figure 13:
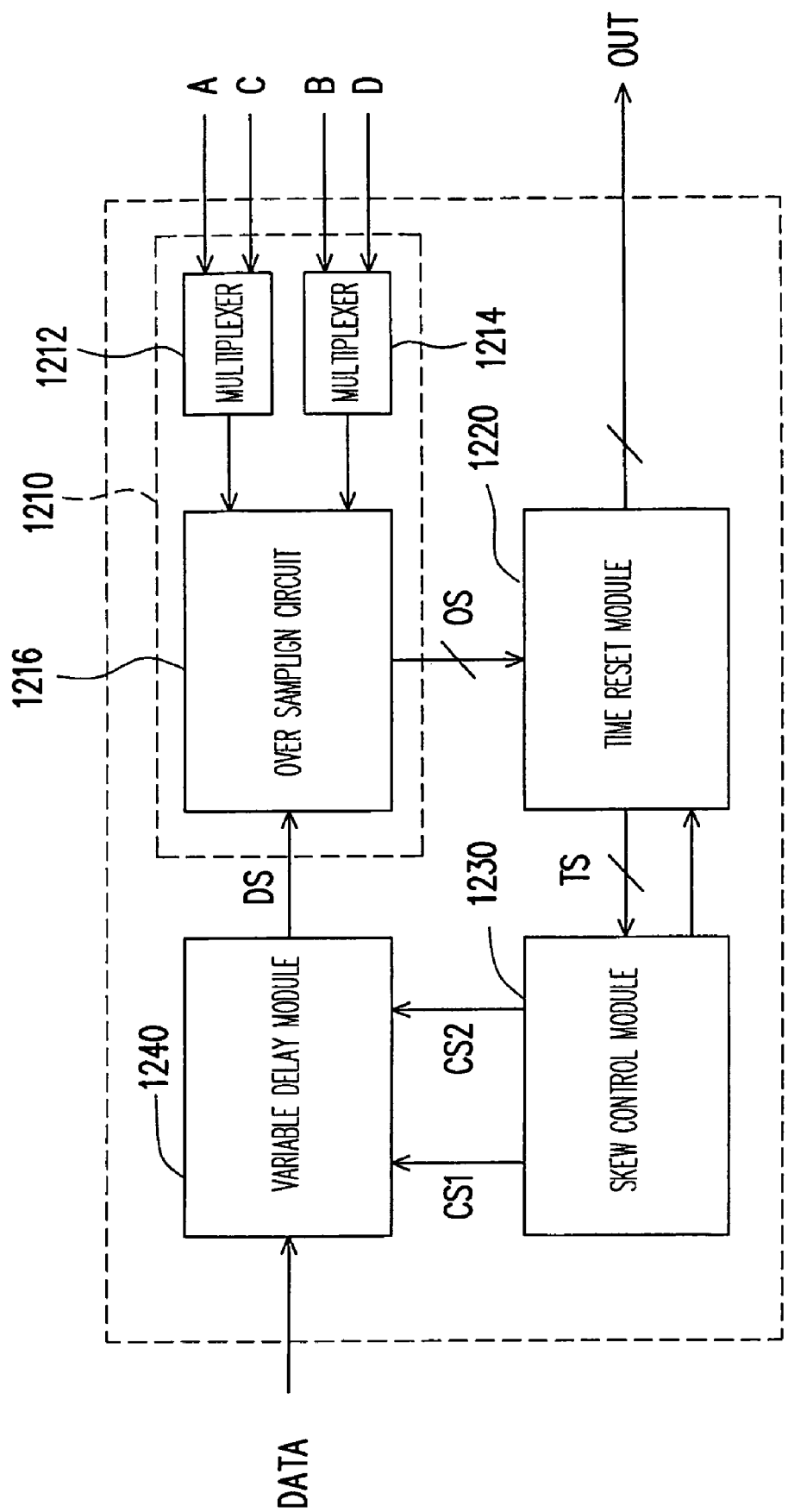

FIG. 13 is a block diagram of a data recovery circuit adopting a sampling method provided by the present invention. Referring to both FIG. 12 and FIG. 13, the data recovery circuit illustrated in FIG. 13 further includes a variable delay module 1240, wherein the over sampling circuit 1216 receives the digital signal DATA through the variable delay module 1240. The variable delay module 1240 controls the delay time of the digital signal DATA according to control signals CS1 and CS2, wherein the control signals CS1 and CS2 are generated by the skew control module 1230 during the second period according to the positions of data transition points of the digital signal DATA. The control signal CS1 is used for controlling the operation during the first period, and the control signal CS2 is used for controlling the operation during the second period. Accordingly, the delay range achieved by the control signal CS2 is smaller than the delay range achieved by the control signal CS1, and the delay range achieved by the control signal CS1 is smaller than or equal to a quarter of the bit length of the digital signal DATA. After the variable delay module 1240 has controlled the delay time of the digital signal DATA according to the control signals CS1 and CS2, the over sampling circuit 1216 samples the output DS of the variable delay module 1240 according to the strobes output by the multiplexers 1212 and 1214.

Figure 14:
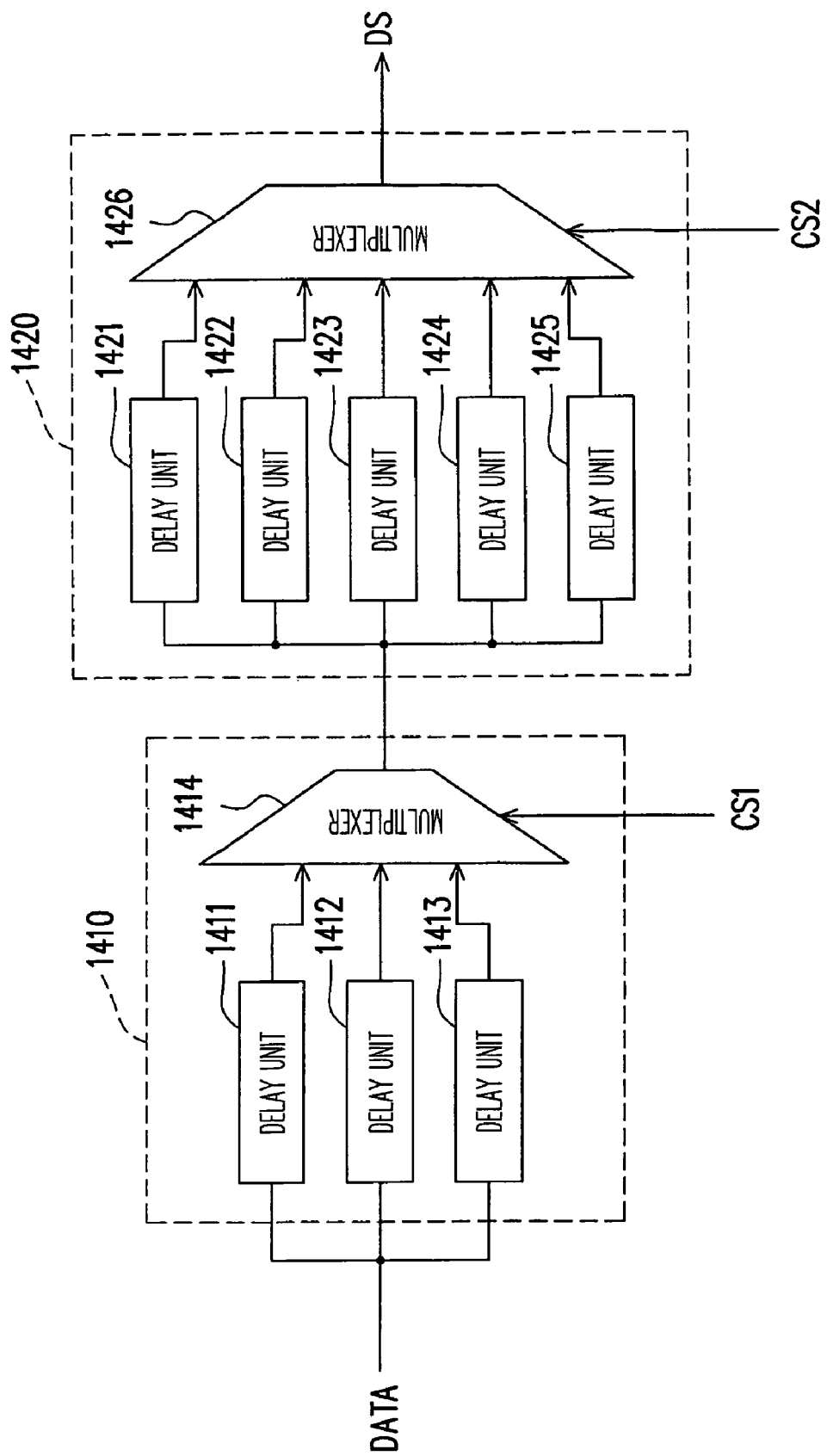
FIG. 14 is a circuit diagram of a variable delay module 1240 according to an embodiment of the present invention.

An embodiment of the variable delay module 1240 will be further explained with reference to FIG. 14 in order to explain how the control signals CS1 and CS2 control the delay time of the digital signal DATA. FIG. 14 is a block diagram of the variable delay module 1240 according to an embodiment of the present invention. Referring to FIG. 14, the variable delay module 1240 includes a first phase delay control circuit 1410 and a second phase delay control circuit 1420. The first phase delay control circuit 1410 includes delay units 1411~1413 and a multiplexer 1414, and the second phase delay control circuit 1420 includes delay units 1421~1425 and a multiplexer 1426. Each of the delay units is implemented with a plurality of inverters connected in series, and the number of inverters in each delay unit is different, and accordingly, the delay time produced by each delay unit is different.

In the first phase delay control circuit 1410, the delay times of the delay units 1411, 1412, and 1413 are respectively set as the least delay time, the preset delay time, and the most delay time of the first phase, and then the multiplexer 1414 selects to maintain the preset delay time or adjust to one of the most delay time and the least delay time according to the control signal CS1. In addition, the space between the least delay time and the preset delay time is equal to the space between the preset delay time and the most delay time, and these two spaces are both smaller than or equal to a quarter of the bit length of the digital signal DATA. In other words, the delay range achieved by controlling the delay time of the digital signal DATA through the first phase delay control circuit 1410 is smaller than or equal to a quarter of the bit length of the digital signal DATA.

Similarly, in the second phase delay control circuit 1420, the delay times of the delay units 1421, 1422, 1423, 1424, and 1425 are respectively set as the least delay time, the second least delay time, the preset delay time, the second most delay time, and the most delay time of the second phase, and then the multiplexer 1426 selects to maintain the preset delay time or adjust to one of the least delay time, the second least delay time, the second most delay time, and the most delay time according to the control signal CS2. During the second phase, the space between the least delay time and the second least delay time, the space between the second least delay time and the preset delay time, the space between the preset delay time and the second most delay time, and the space between the second most delay time and the most delay time are all the same.

Additionally, the space between the least delay time and the preset delay time and the space between the preset delay time and the most delay time in the second phase are both smaller than the space between the least delay time and the preset delay time and the space between the preset delay time and the most delay time in the first phase. In other words, the delay range of the second phase is smaller than the delay range of the first phase. Accordingly, the delay control in the first phase is to roughly adjust the delay time of the digital signal DATA, and the delay control in the second phase is to finely adjust the delay time of the digital signal DATA. FIG. 14 only illustrates an embodiment of the delay control circuit, and the number of delay units in each delay control circuit can be changed or the number of delay control circuits can even be increased according to the actual design requirement in order to adjust the delay time of the digital signal in a finer way.

Figure 15:
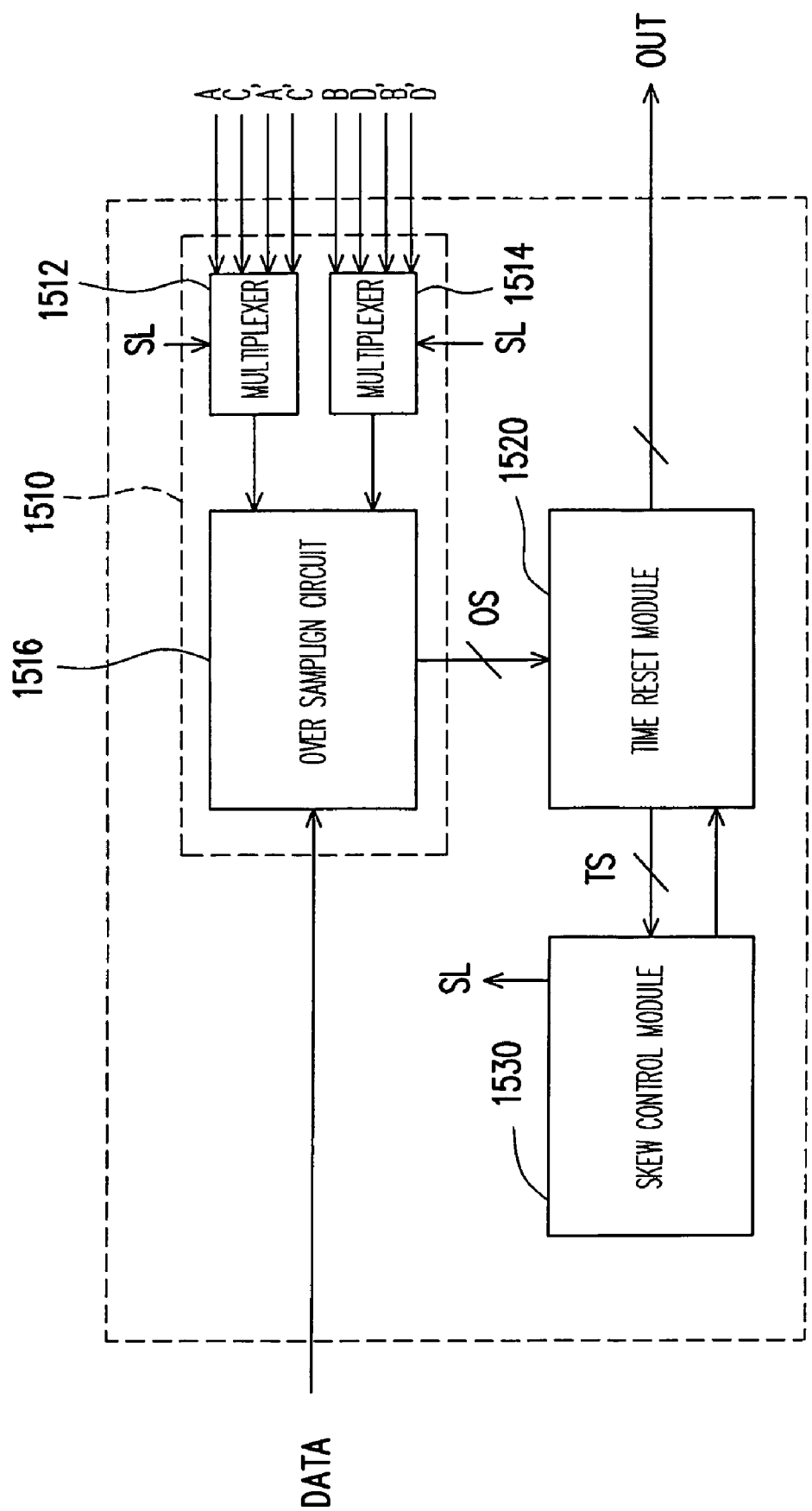

A data recovery circuit wherein a preferable sampling strobe is selected among four strobes has been described above. Below, a data recovery circuit wherein a preferable sampling strobe is selected among eight strobes will be described with reference to FIG. 15. FIG. 15 is a block diagram of a data recovery circuit according to an embodiment of the present invention. Referring to FIG. 15, the data recovery circuit includes an over sampling module 1510; a time reset module 1520, and a skew control module 1530. The over sampling module 1510 receives a strobe A, a strobe B, a strobe C, a strobe D, a strobe A', a strobe B', a strobe C', and a strobe D', wherein all the eight strobes have the same frequency, strobe B lags strobe A a first predetermined phase, strobe C and strobe D respectively lag strobe A and strobe B a second predetermined phase, strobe A', strobe B', strobe C', and strobe D' respectively lag strobe A, strobe B, strobe C, and strobe D a third predetermined phase, the second predetermined phase is half of the first predetermined phase, and the third predetermined phase is half of the second predetermined phase. In the present embodiment, the first predetermined phase is set to 180°, thus, the second predetermined phase is 90° and accordingly the second predetermined phase is 45°. Besides, the data of a digital signal DATA is transmitted in series, and the bit length of the digital signal DATA is equal to the strobe cycles of foregoing eight strobes.

The operation of the circuit illustrated in FIG. 15 can be divided into three phases. First, during the first period, the over sampling module 1510 samples the digital signal DATA with strobe A and strobe B, wherein the digital signal DATA is always sampled at the rising edges or the falling edges of strobe A and strobe B. Moreover, the over sampling module 1510 converts the sampling results into a parallel data and outputs the parallel data as an output OS. Next, the time reset module 1520 synchronizes the parallel data output by the over sampling module 1510 and generates a synchronized result TS. The synchronized result TS is a synchronized parallel data, and accordingly the time difference of the data is eliminated. In the present embodiment, the parallel data can be synchronized by re-sampling the parallel data with an independent strobe. After that, the skew control module 1530 determines the positions of data transition points of the digital signal DATA according to the synchronized result TS and selects strobe C or strobe D as a preferable sampling strobe according to the determination result. The method for determining the positions of data transition points of the digital signal DATA has been explained in the descriptions related to foregoing expression (1) and expression (2), and the method for selecting the preferable sampling strobe has also been discussed in foregoing embodiments, therefore will not be described herein.

After the preferable sampling strobe has been selected, the operation of the data recovery circuit enters the second period. During the second period, the over sampling module 1510 samples the digital signal DATA with strobe C and strobe D, wherein the sampling edges of strobe C and strobe D are the same as the sampling edges of strobe A. Moreover, the over sampling module 1510 converts the sampling results into a parallel data and outputs the parallel data as an output OS. Next, the time reset module 1520 synchronizes the parallel data output by the over sampling module 1510 and generates a synchronized result TS. After that, the skew control module 1530 determines the positions of data transition points of the digital signal DATA according to the synchronized result TS and selects one of two strobes which have a difference of the third predetermined phase from the preferable sampling strobe as an optimal sampling strobe according to the determination result, and the skew control module 1530 generates a selection signal SL according to the optimal sampling strobe. The method for determining the positions of data transition points of the digital signal DATA has been explained in the description related to foregoing expression (3) and expression (4), and the method for selecting the optimal sampling strobe has also been discussed in foregoing embodiments, therefore will not be described herein.

After the optimal sampling strobe has been selected, the operation of the data recovery circuit enters a third period. During the third period, the over sampling module 1510 selects strobe A' and strobe B' or strobe C' and strobe D' for sampling the digital signal DATA according to the selection signal SL. In other words, the over sampling module 1510 selects an optimal sampling strobe and a strobe which has a difference of 180° from the selected optimal sampling strobe among strobes A', strobe B', strobe C', and strobe D' according to the selection signal SL, and the sampling edges of the two strobes are the same as the sampling edges of strobe A. Moreover, the over sampling module 1510 converts the sampling results into a parallel data and outputs the parallel data as an output OS. Next, the time reset module 1520 synchronizes the parallel data output by the over sampling module 1510 and generates a synchronized result TS. After that, the skew control module 1530 controls the time reset module 1520 to select the synchronized parallel data obtained with the optimal sampling strobe from the synchronized result TS as the output OUT of the data recovery circuit.

In the present embodiment, the over sampling module 1510 includes multiplexers 1512, 1514, and an over sampling circuit 1516. The multiplexer 1512 receives strobe A, strobe C, strobe A', and strobe C' and respectively outputs strobe A and strobe C during the first period and the second period. During the third period, the multiplexer 1512 selects an optimal sampling strobe or a strobe which has a difference of 180° from the optimal sampling strobe among strobe A' and strobe C' according to the selection signal SL. The multiplexer 1514 receives strobe B, strobe D, strobe B', and strobe D' and respectively outputs strobe B and strobe D during the first period and the second period. During the third period, the multiplexer 1514 select a strobe among strobe B' and strobe D' according to the selection signal SL, and the selected strobe has a difference of 180° from the output of the multiplexer 1512. The over sampling circuit 1516 samples the digital signal DATA with the strobes output by the multiplexers 1512 and 1514.

Figure 16:
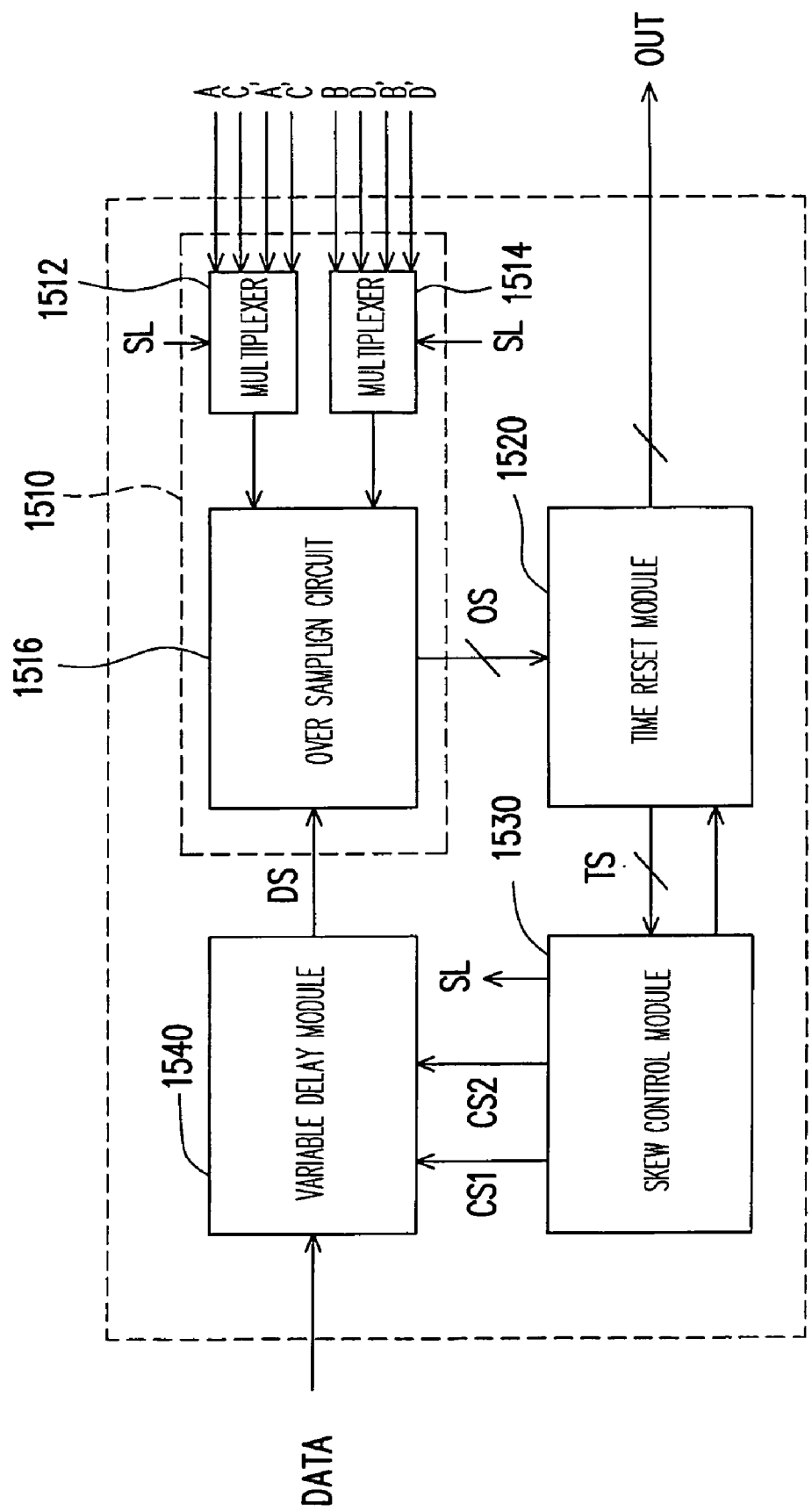

Similarly, the circuit illustrated in FIG. 15 may also include a variable delay module for adjusting the delay time of the digital signal DATA. Below, the situation of controlling the delay time of the digital signal DATA in two phases will be described as an example with reference to FIG. 16. FIG. 16 is a block diagram of a data recovery circuit according to an embodiment of the present invention. Referring to both FIG. 15 and FIG. 16, the circuit illustrated in FIG. 16 further includes a variable delay module 1540, wherein the over sampling circuit 1516 receives the digital signal DATA through the variable delay module 1540. The operation of the variable delay module 1540 is identical to that of the variable delay module 1240 illustrated in FIG. 13, therefore the internal circuit of the variable delay module 1540 may also be implemented as the circuit illustrated in FIG. 14.

Figure 17:
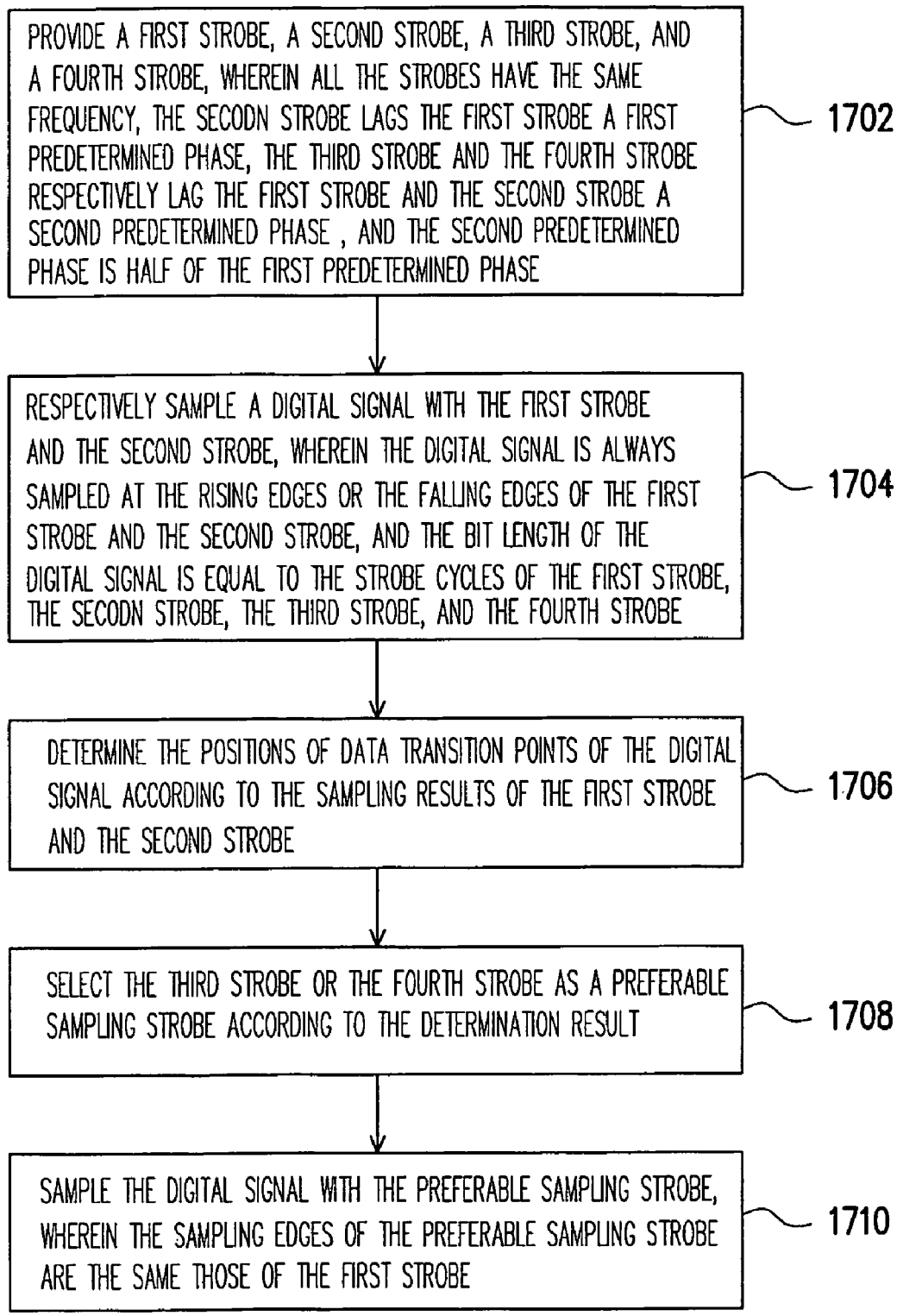
FIG. 17 is a flowchart of a sampling method according to an embodiment of the present invention.

A basic operation flow can be summarized based on foregoing embodiments. FIG. 17 is a flowchart of a sampling method according to an embodiment of the present invention. Referring to FIG. 17, first, a first strobe, a second strobe, a third strobe, and a fourth strobe are provided, wherein all the strobes have the same frequency, the second strobe lags the first strobe a first predetermined phase, the third strobe and the fourth strobe respectively lag the first strobe and the second strobe a second predetermined phase, and the second predetermined phase is half of the first predetermined phase (step 1702). Next, a digital signal is respectively sampled with the first strobe and the second strobe, wherein the digital signal is always sampled at the rising edges or the falling edges of the first strobe and the second strobe, and the bit length of the digital signal is equal to the strobe cycles of the first strobe, the second strobe, the third strobe, and the fourth strobe (step 1704). After that, the positions of data transition points of the digital signal are determined according to the sampling results of the first strobe and the second strobe (step 1706). Next, the third strobe or the fourth strobe is selected as a preferable sampling strobe according to the determination result (step 1708). Thereafter, the digital signal is sampled with the preferable sampling strobe, wherein the sampling edges of the preferable sampling strobe are the same as the sampling edges of the first strobe (step 1710).

In overview, in the present invention, four sampling strobes having the same frequency but different phase delays are provided, wherein the second strobe lags the first strobe a first predetermined phase, the third strobe and the fourth strobe respectively lag the first strobe and the second strobe a second predetermined phase, and the second predetermined phase is half of the first predetermined phase. Next, the positions of data transition points of a digital signal are determined with the first strobe and the second strobe, and one of the third strobe and the fourth strobe which has its sampling edges closer to the middle points of the bits of the digital signal is selected as a preferable sampling strobe. The preferable sampling strobe is used for sampling the digital signal so that the accuracy in data sampling is increased. Moreover, in the present invention, the middle points of the bits of the digital signal can be adjusted to be at the sampling edges of the preferable sampling strobe or closer to the sampling edges of the preferable sampling strobe by adjusting the delay time of the digital signal, so that the accuracy in data sampling can be further improved.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A sampling method, comprising:
providing a first strobe, a second strobe, a third strobe, and a fourth strobe, wherein all the strobes have the same frequency, the second strobe lags the first strobe a first predetermined phase, the third strobe and the fourth strobe respectively lag the first strobe and the second strobe a second predetermined phase, and the second predetermined phase is half of the first predetermined phase;
respectively sampling a digital signal with the first strobe and the second strobe, wherein the digital signal is always sampled at sampling edges of the first strobe and the second strobe, the sampling edges are the rising edges or the falling edges of the first strobe and the second strobe, and the bit length of the digital signal is equal to the strobe cycles of the first strobe, the second strobe, the third strobe, and the fourth strobe;
determining positions of data transition points of the digital signal according to the sampling results of the first strobe and the second strobe, wherein the positions of data transition points of the digital signal are relative to the sampling edges of the first strobe and the second strobe;
selecting the third strobe or the fourth strobe as a preferable sampling strobe according to the determination result; and
sampling the digital signal with the preferable sampling strobe, wherein the sampling edges of the preferable sampling strobe are the same as the sampling edges of the first strobe.

2. The sampling method according to claim 1, wherein the method for determining the positions of data transition points of the digital signal comprises determining whether the data transition points of the digital signal are located after the sampling edges of the first strobe and before the sampling edges of the second strobe, after the sampling edges of the second strobe and before the sampling edges of the first strobe, at the sampling edges of the first strobe, or at the sampling edges of the second strobe, wherein when it is determined that the data transition points of the digital signal are located after the sampling edges of the first strobe and before the sampling edges of the second strobe, the fourth strobe is selected as the preferable sampling strobe; when it is determined that the data transition points of the digital signal are located after the sampling edges of the second strobe and before the sampling edges of the first strobe, the third strobe is selected as the preferable sampling strobe; and when it is determined that the data transition points of the digital signal are located at the sampling edges of the first strobe or at the sampling edges of the second strobe, one of the third strobe and the fourth strobe is selected as the preferable sampling strobe.

3. The sampling method according to claim 2, wherein before sampling the digital signal with the preferable sampling strobe, the sampling method further comprises:
controlling the delay time of the digital signal according to the positions of data transition points of the digital signal so as to adjust the middle points of the bits of the digital signal to be at the sampling edges of the preferable sampling strobe or close to the sampling edges of the preferable sampling strobe.

4. The sampling method according to claim 3, wherein the method for controlling the delay time of the digital signal comprises determining whether the data transition points of the digital signal are located after the sampling edges of the third strobe and before the sampling edges of the fourth strobe, or after the sampling edges of the fourth strobe and before the sampling edges of the third strobe, when the third strobe is selected as the preferable sampling strobe, and it is determined that the data transition points of the digital signal are located after the sampling edges of the third strobe and before the sampling edges of the fourth strobe, the delay time of the digital signal is increased, when the third strobe is selected as the preferable sampling strobe, and it is determined that the data transition points of the digital signal are located after the sampling edges of the fourth strobe and before the sampling edges of the third strobe, the delay time of the digital signal is decreased, when the fourth strobe is selected as the preferable sampling strobe, and it is determined that the data transition points of the digital signal are located after the sampling edges of the third strobe and before the sampling edges of the fourth strobe, the delay time of the digital signal is decreased, when the fourth strobe is selected as the preferable sampling strobe, and it is determined that the data transition points of the digital signal are located after the sampling edges of the fourth strobe and before the sampling edges of the third strobe, the delay time of the digital signal is increased.

5. The sampling method according to claim 4 further comprising increasing or decreasing the delay time of the digital signal in K phases, wherein the adjusting range of a current phase is larger than that of the next one, and the adjusting range of a first phase is smaller than or equal to a quarter of the bit length of the digital signal.

6. The sampling method according to claim 1 further comprising providing a fifth strobe, a sixth strobe, a seventh strobe, and an eighth strobe, wherein the frequencies of the fifth strobe, the sixth strobe, the seventh strobe, and the eighth strobe are the same as the frequency of the first strobe, the fifth strobe, the sixth strobe, the seventh strobe, and the eighth strobe respectively lag the first strobe, the second strobe, the third strobe, and the fourth strobe a third predetermined phase, and the third predetermined phase is half of the second predetermined phase, and while sampling the digital signal with the preferable sampling strobe, one of the third strobe and the fourth strobe which is different from the preferable sampling strobe is used as a reference strobe and the digital signal is sampled with the reference strobe, wherein the sampling edges of the reference strobe are the same as the sampling edges of the preferable sampling strobe, the sampling method further comprises:

determining the positions of data transition points of the digital signal according to the sampling results of the preferable sampling strobe and the reference strobe;

selecting one of two strobes which have a difference of the third predetermined phase from the preferable sampling strobe as an optimal sampling strobe according to the determination result; and sampling the digital signal with the optimal sampling strobe, wherein the sampling edges of the optimal sampling strobe are the same as the sampling edges of the preferable sampling strobe.

7. The sampling method according to claim 6, wherein the method for determining the positions of data transition points of the digital signal comprises determining whether the data transition points of the digital signal are located after the sampling edges of the preferable sampling strobe and before the sampling edges of the reference strobe, after the sampling edges of the reference strobe and before the sampling edges of the preferable sampling strobe, or at the sampling edges of the reference strobe, wherein when the third strobe is selected as the preferable sampling strobe and it is determined that the data transition points of the digital signal are located after the sampling edges of the preferable sampling strobe and before the sampling edges of the reference strobe, the fifth strobe is selected as the optimal sampling strobe; when the third strobe is selected as the preferable sampling strobe and it is determined that the data transition points of the digital signal are located after the sampling edges of the reference strobe and before the sampling edges of the preferable sampling strobe, the seventh strobe is selected as the optimal sampling strobe; when the third strobe is selected as the preferable sampling strobe and it is determined that the data transition points of the digital signal are located at the sampling edges of the reference strobe, one of the fifth strobe and the seventh strobe is selected as the optimal sampling strobe; when the fourth strobe is selected as the preferable sampling strobe and it is determined that the data transition points of the digital signal are located after the sampling edges of the preferable sampling strobe and before the sampling edges of the reference strobe, the sixth strobe is selected as the optimal sampling strobe; when the fourth strobe is selected as the preferable sampling strobe and it is determined that the data transition points of the digital signal are located after the sampling edges of the reference strobe and before the sampling edges of the preferable sampling strobe, the eighth strobe is selected as the optimal sampling strobe; when the fourth strobe is selected as the preferable sampling strobe and it is determined that the data transition points of the digital signal are located at the sampling edges of the reference strobe, one of the sixth strobe and the eighth strobe is selected as the optimal sampling strobe.

8. A data recovery circuit, comprising:
an over sampling module, receiving a first strobe, a second strobe, a third strobe, and a fourth strobe, wherein all the strobes have the same frequency, the second strobe lags the first strobe a first predetermined phase, the third strobe and the fourth strobe respectively lag the first strobe and the second strobe a second predetermined phase, and the second predetermined phase is half of the first predetermined phase; during a first period, the over sampling module samples a digital signal with the first strobe and the second strobe, wherein the digital signal is always sampled at sampling edges of the first strobe and the second strobe, the sampling edges are the rising edges or the falling edges of the first strobe and the second strobe; during a second period, the over sampling module samples the digital signal with the third strobe and the fourth strobe, wherein the sampling edges of the third strobe and the fourth strobe are the same as the sampling edges of the first strobe; the over sampling module converts the sampling results into parallel data and outputs the parallel data, wherein the bit length of the digital signal is equal to the strobe cycles of the first strobe, the second strobe, the third strobe, and the fourth strobe;

a time reset module, synchronizing the parallel data output by the over sampling module and generating a synchronized result; and a skew control module, during the first period, the skew control module determining positions of data transition points of the digital signal according to the synchronized result and selecting the third strobe or the fourth strobe as a preferable sampling strobe according to the determination result, wherein the positions of data transition points of the digital signal are relative to the sampling edges of the first strobe and the second strobe, during the second period, the skew control module controlling the time reset module to select a synchronized parallel data obtained with the preferable sampling strobe from the synchronized result as an output of the data recovery circuit.

9. The data recovery circuit according to claim 8, wherein the over sampling module comprises:
a first multiplexer, receiving the first strobe and the third strobe, and respectively outputting the first strobe and the third strobe during the first period and the second period;
a second multiplexer, receiving the second strobe and the fourth strobe, and respectively outputting the second strobe and the fourth strobe during the first period and the second period; and
an over sampling circuit, sampling the digital signal with the strobes output by the first multiplexer and the second multiplexer.

10. The data recovery circuit according to claim 8, wherein the method for the skew control module to determine the positions of data transition points of the digital signal comprises determining whether the data transition points of the digital signal are located after the sampling edges of the first strobe and before the sampling edges of the second strobe, after the sampling edges of the second strobe and before the sampling edges of the first strobe, at the sampling edges of the first strobe, or at the sampling edges of the second strobe, wherein when the skew control module determines that the data transition points of the digital signal are located after the sampling edges of the first strobe and before the sampling edges of the second strobe, the skew control module selects the fourth strobe as the preferable sampling strobe; when the skew control module determines that the data transition points of the digital signal are located after the sampling edges of the second strobe and before the sampling edges of the first strobe, the skew control module selects the third strobe as the preferable sampling strobe; and when the skew control module determines that the data transition points of the digital signal are located at the sampling edges of the first strobe or at the sampling edges of the second strobe, the skew control module selects one of the third strobe and the fourth strobe as the preferable sampling strobe.

11. The data recovery circuit according to claim 8 further comprising a variable delay module, wherein the over sampling module receives the digital signal through the variable delay module, the variable delay module controls the delay time of the digital signal according to a first control signal, and during the second period, the skew control module generates the first control signal according to the positions of data transition points of the digital signal.

12. The data recovery circuit according to claim 11, wherein the delay range achieved by controlling the delay time of the digital signal according to the first control signal is smaller than or equal to a quarter of the bit length of the digital signal.

13. The data recovery circuit according to claim 12, wherein the variable delay module further controls the delay time of the digital signal according to a second control signal, the delay range achieved by controlling the delay time of the digital signal according to the second control signal is smaller than the delay range achieved by controlling the delay time of the digital signal according to the first control signal, and during the second period, the skew control module generates the second control signal according to the positions of data transition points of the digital signal.

14. A data recovery circuit, comprising:
an over sampling module, receiving a first strobe, a second strobe, a third strobe, a fourth strobe, a fifth strobe, a sixth strobe, a seventh strobe, and an eighth strobe, wherein all the strobes have the same frequency, the second strobe lags the first strobe a first predetermined phase, the third strobe and the fourth strobe respectively lag the first strobe and the second strobe a second predetermined phase, the fifth strobe, the sixth strobe, the seventh strobe, and the eighth strobe respectively lag the first strobe, the second strobe, the third strobe, and the fourth strobe a third predetermined phase, the second predetermined phase is half of the first predetermined phase, and the third predetermined phase is half of the second predetermined phase; during a first period, the over sampling module samples a digital signal with the first strobe and the second strobe, wherein the digital signal is always sampled at the rising edges or the falling edges of the first strobe and the second strobe; during a second period, the over sampling module samples the digital signal with the third strobe and the fourth strobe, wherein the sampling edges of the third strobe and the fourth strobe are the same as the sampling edges of the first strobe; during a third period, the over sampling module samples the digital signal with the fifth strobe and the sixth strobe or with the seventh strobe and the eighth strobe, wherein the sampling edges of the fifth strobe, the sixth strobe, the seventh strobe, and the eighth strobe are the same as the sampling edges of the first strobe; and the over sampling module converts the sampling results into parallel data and outputs the parallel data, wherein the bit length of the digital signal is equal to the strobe cycles of the first strobe, the second strobe, the third strobe, the fourth strobe, the fifth strobe, the sixth strobe, the seventh strobe, and the eighth strobe;
a time reset module, synchronizing the parallel data output by the over sampling module and generating a synchronized result; and
a skew control module, during the first period, the skew control module determining the positions of data transition points of the digital signal according to the synchronized result and selecting the third strobe or the fourth strobe as a preferable sampling strobe according to the determination result, during the second period, the skew control module determining the positions of data transition points of the digital signal according to the synchronized result and selecting one of two strobes which have a difference of the third predetermined phase from the preferable sampling strobe as an optimal sampling strobe according to the determination result, during the third period, the skew control module controlling the over sampling module to select the optimal sampling strobe and a strobe which have a difference of the first predetermined phase from the optimal sampling strobe for sampling the digital signal, and the skew control module controlling the time reset module to select a synchronized parallel data obtained with the optimal sampling strobe from the synchronized result as an output of the data recovery circuit.

15. The data recovery circuit according to claim 14, wherein the over sampling module comprises:
a first multiplexer, receiving the first strobe, the third strobe, the fifth strobe, and the seventh strobe, and respectively outputting the first strobe and the third strobe during the first period and the second period, and during the third period, the skew control module controlling the first multiplexer to select the optimal sampling strobe from the fifth strobe and the seventh strobe or a strobe which has a difference of the first predetermined phase from the optimal sampling strobe as an output;
a second multiplexer, receiving the second strobe, the fourth strobe, the sixth strobe, and the eighth strobe, and respectively outputting the second strobe and the fourth strobe during the first period and the second period, and during the third period, the skew control module controlling the second multiplexer to select a strobe from the sixth strobe and the eighth strobe as an output, and the selected strobe has a difference of the first predetermined phase from the output of the first multiplexer; and
an over sampling circuit, sampling the digital signal with the strobes output by the first multiplexer and the second multiplexer.

16. The data recovery circuit according to claim 14 further comprising a variable delay module, wherein the over sampling module receives the digital signal through the variable delay module, the variable delay module controls the delay time of the digital signal according to a first control signal, and during the third period, the skew control module generates the first control signal according to the positions of data transition points of the digital signal.

17. The data recovery circuit according to claim 16, wherein the delay range achieved by controlling the delay time of the digital signal according to the first control signal is smaller than or equal to an eighth of the bit length of the digital signal.

18. The data recovery circuit according to claim 17, wherein the variable delay module further controls the delay time of the digital signal according to a second control signal, and the delay ranged achieved by controlling the delay time of the digital signal according to the second control signal is smaller than the delay range achieved by controlling the delay time of the digital signal according to the first control signal, and during the third period, the skew control module generates the second control signal according to the positions of data transition points of the digital signal.

19. The sampling method according to claim 1, wherein, the frequency is no greater than a bit length of a data sequence.

* * * * *